United States Patent [19]

Ishimaru et al.

[11] Patent Number: 4,483,215
[45] Date of Patent: Nov. 20, 1984

[54] TRANSMISSION WITH OVERDRIVE

[75] Inventors: Wataru Ishimaru, Zushi; Kunio Ohtsuka, Yokohama, both of Japan

[73] Assignee: Nissan Motor Company, Limited, Yokohama, Japan

[21] Appl. No.: 219,636

[22] Filed: Dec. 24, 1980

[30] Foreign Application Priority Data

Dec. 27, 1979 [JP] Japan ............................ 54-173603

[51] Int. Cl.³ .......................................... F16H 57/10
[52] U.S. Cl. ...................................... 74/759; 74/765; 74/781 R
[58] Field of Search ............. 74/781 R:782, 783, 784, 74/764, 765, 758, 759

[56] References Cited

U.S. PATENT DOCUMENTS

| 2,703,500 | 3/1955 | Roche | 74/731 |
|---|---|---|---|
| 2,725,762 | 12/1955 | Hettinger, Jr. et al. | 74/688 |
| 3,049,945 | 4/1962 | Lindsay | 74/758 |
| 3,424,031 | 1/1969 | Stockton | 74/695 |
| 3,491,621 | 1/1970 | Moan | 74/759 |
| 3,946,622 | 3/1976 | Murakami et al. | 74/759 |
| 3,946,623 | 3/1976 | Murakami et al. | 74/764 |
| 3,979,974 | 9/1976 | Murakami | 74/759 |
| 3,987,690 | 10/1976 | Murakami et al. | 74/759 |
| 3,999,448 | 12/1976 | Murakami et al. | 74/759 |
| 4,027,551 | 6/1977 | Murakami et al. | 74/759 |
| 4,056,990 | 11/1977 | Hatano | 74/781 |
| 4,086,827 | 5/1978 | Chana | 74/759 |
| 4,089,239 | 5/1978 | Murakami et al. | 74/759 |
| 4,143,562 | 3/1979 | Murakami et al. | 74/759 |
| 4,144,776 | 3/1979 | Yamamori et al. | 74/759 |
| 4,242,924 | 1/1981 | Melhorn et al. | 74/759 |
| 4,324,321 | 4/1982 | Ushijima et al. | 74/783 |

FOREIGN PATENT DOCUMENTS

| 681564 | 10/1966 | Belgium . | |
|---|---|---|---|
| 0519092 | 8/1976 | Japan . | |
| 0018570 | 2/1977 | Japan | 74/758 |
| 0076570 | 6/1977 | Japan | 74/758 |
| 0077973 | 6/1977 | Japan | 74/758 |
| 600790 | 7/1945 | United Kingdom . | |
| 1230474 | 5/1971 | United Kingdom . | |
| 1522616 | 8/1978 | United Kingdom . | |
| 1536080 | 12/1978 | United Kingdom . | |
| 2018916 | 10/1979 | United Kingdom . | |
| 2036896 | 7/1980 | United Kingdom . | |

Primary Examiner—Allan D. Herrmann
Assistant Examiner—D. Wright
Attorney, Agent, or Firm—Schwartz, Jeffery, Schwaab, Mack, Blumenthal & Koch

[57] ABSTRACT

A transmission with an overdrive is disclosed. It includes an input planetary gear set and an output planetary gear set wherein a first element of the input planetary gear set is connected to a drive shaft and an output element of the output planetary gear set is connected to a driven shaft. The two planetary gear sets are connected with each other through a permanent connection and through a bridging clutch.

25 Claims, 30 Drawing Figures

|  | $C_1$ | $C_2$ | $C_3$ | $B_1$ | $B_2$ | GEAR RATIO | $\alpha_1 =$ $\alpha_2 =$ } 0.45 |
|---|---|---|---|---|---|---|---|
| 1st |  |  | ○ | ○ |  | $\dfrac{1+\alpha_2}{\alpha_2}$ | 3.22 |
| 2nd |  |  | ○ |  | ○ | $\dfrac{\alpha_1+\alpha_2}{\alpha_2(1+\alpha_1)}$ | 1.38 |
| 3rd | ○ |  | ○ |  |  | 1 | 1 |
| 4th | ○ |  |  |  | ○ | $\dfrac{1}{1+\alpha_1}$ | 0.69 |
| Rev. |  | ○ | ○ |  |  | $-\dfrac{1}{\alpha_1}$ | −2.22 |

|  | $C_1$ | $C_2$ | $C_3$ | $B_1$ | $B_2$ | GEAR RATIO | $\alpha_1 = \alpha_2 = \} 0.45$ |
|---|---|---|---|---|---|---|---|
| 1st |  |  | ○ | ○ |  | $\dfrac{1+\alpha_2}{\alpha_2}$ | 3.22 |
| 2nd |  |  | ○ |  | ○ | $\dfrac{\alpha_1}{\alpha_2(1+\alpha_1)} + 1$ | 1.69 |
| 3rd | ○ |  | ○ |  |  | 1 | 1 |
| 4th | ○ |  |  |  | ○ | $\dfrac{1}{1+\alpha_1}$ | 0.69 |
| Rev. |  | ○ | ○ |  |  | $-\dfrac{1}{\alpha_1}$ | −2.22 |

|  | $C_1$ | $C_2$ | $C_3$ | $B_1$ | $B_2$ | GEAR RATIO | $\alpha_1 =$ $\alpha_2 =$ } 0.5 |
|---|---|---|---|---|---|---|---|
| 1st |  |  | ○ | ○ |  | $\dfrac{1}{1-\alpha_2}$ | 2.00 |
| 2nd |  |  | ○ |  | ○ | $\dfrac{1+\alpha_1-\alpha_2}{(1-\alpha_2)(1+\alpha_1)}$ | 1.33 |
| 3rd | ○ | ○ |  |  |  | 1 | 1 |
| 4th | ○ |  |  |  | ○ | $\dfrac{1}{1+\alpha_1}$ | 0.67 |
| Rev. |  | ○ |  | ○ |  | $-\dfrac{1}{\alpha_1}$ | −2.00 |

|     | $C_1$ | $C_2$ | $C_3$ | $B_1$ | $B_2$ | GEAR RATIO | $\alpha_1 = 0.45$ $\alpha_2 = 0.4$ |
|-----|-------|-------|-------|-------|-------|------------|----------|
| 1st |       |       | ○     | ○     |       | $\dfrac{1}{\alpha_2}$ | 2.50 |
| 2nd |       |       | ○     |       | ○     | $\dfrac{\alpha_1 + \alpha_2}{\alpha_2(1+\alpha_1)}$ | 1.47 |
| 3rd | ○     |       | ○     |       |       | 1 | 1 |
| 4th | ○     |       |       |       | ○     | $\dfrac{1}{1+\alpha_1}$ | 0.69 |
| Rev.|       | ○     |       | ○     |       | $-\dfrac{1}{\alpha_1}$ | −2.22 |

|  | $C_1$ | $C_2$ | $C_3$ | $B_1$ | $B_2$ | GEAR RATIO | $\alpha_1 = \alpha_2 =$ 0.45 |
|---|---|---|---|---|---|---|---|
| 1st |  |  | ○ | ○ |  | $\dfrac{1}{\alpha_2}$ | 2.22 |
| 2nd |  |  | ○ |  | ○ | $\dfrac{\alpha_1 + \alpha_2}{\alpha_2(1 + \alpha_1)}$ | 1.38 |
| 3rd | ○ |  | ○ |  |  | 1 | 1 |
| 4th | ○ |  |  |  | ○ | $\dfrac{1}{1 + \alpha_1}$ | 0.69 |
| Rev. |  | ○ |  | ○ |  | $-\dfrac{1}{\alpha_1}$ | $-2.22$ |

|  | $C_1$ | $C_2$ | $C_3$ | $B_1$ | $B_2$ | GEAR RATIO | $\alpha_1 = \alpha_2 = $ 0.45 |
|---|---|---|---|---|---|---|---|
| 1st |  |  | ◯ | ◯ |  | $\dfrac{1}{\alpha_2}$ | 2.22 |
| 2nd |  |  | ◯ |  | ◯ | $\dfrac{\alpha_1 + \alpha_2}{\alpha_2(1+\alpha_1)}$ | 1.38 |
| 3rd | ◯ |  | ◯ |  |  | 1 | 1 |
| 4th | ◯ |  |  |  | ◯ | $\dfrac{1}{1+\alpha_1}$ | 0.69 |
| Rev. |  | ◯ |  | ◯ |  | $-\dfrac{1}{\alpha_1}$ | $-2.22$ |

| | $C_1$ | $C_2$ | $C_3$ | $B_1$ | $B_2$ | GEAR RATIO | $\alpha_1 = 0.5$ $\alpha_2 = 0.7$ |
|---|---|---|---|---|---|---|---|
| 1st | | | ○ | ○ | | $\dfrac{1 + \alpha_1 - \alpha_2}{1 - \alpha_2}$ | 2.67 |
| 2nd | | | ○ | | ○ | $1 + \alpha_1$ | 1.50 |
| 3rd | ○ | | ○ | | | 1 | 1 |
| 4th | ○ | | | | ○ | $\alpha_2$ | 0.70 |
| Rev. | | ○ | | ○ | | $-\dfrac{\alpha_2}{1 - \alpha_2}$ | -2.33 |

|  | $C_1$ | $C_2$ | $C_3$ | $B_1$ | $B_2$ | GEAR RATIO | $\alpha_1 = 0.45$ $\alpha_2 = 0.6$ |
|---|---|---|---|---|---|---|---|
| 1st |  |  | ○ | ○ |  | $\dfrac{1}{1-\alpha_2}$ | 2.5 |
| 2nd |  |  | ○ |  | ○ | $\dfrac{1+\alpha_1-\alpha_2}{(1+\alpha_1)(1-\alpha_2)}$ | 1.47 |
| 3rd | ○ |  | ○ |  |  | 1 | 1 |
| 4rh | ○ |  |  |  | ○ | $\dfrac{1}{1+\alpha_1}$ | 0.69 |
| Rev. |  | ○ |  | ○ |  | $-\dfrac{1}{\alpha_1}$ | −2.22 |

| | $C_1$ | $C_2$ | $C_3$ | $B_1$ | $B_2$ | GEAR RATIO | $\alpha_1=0.45$ $\alpha_2=0.4$ |
|---|---|---|---|---|---|---|---|
| 1st | | | ◯ | ◯ | | $\dfrac{1}{\alpha_2}$ | 2.5 |
| 2nd | | | ◯ | | ◯ | $\dfrac{\alpha_1+\alpha_2}{\alpha_2(1+\alpha_1)}$ | 1.47 |
| 3rd | ◯ | | ◯ | | | 1 | 1 |
| 4th | ◯ | | | | ◯ | $\dfrac{1}{1+\alpha_1}$ | 0.69 |
| Rev. | | ◯ | | ◯ | | $-\dfrac{1}{\alpha_1}$ | $-2.22$ |

|      | $C_1$ | $C_2$ | $C_3$ | $B_1$ | $B_2$ | GEAR RATIO | $\alpha_1 =$ $\alpha_2 =$ } 0.45 |
|------|-------|-------|-------|-------|-------|------------|---------|
| 1st  |       |       | ○     | ○     |       | $\dfrac{1-\alpha_1}{\alpha_1 \, \alpha_2}$ | 2.72 |
| 2nd  |       |       | ○     |       | ○     | $\dfrac{1}{\alpha_1(1+\alpha_2)}$ | 1.53 |
| 3rd  | ○     |       | ○     |       |       | 1 | 1 |
| 4th  | ○     |       |       |       | ○     | $\dfrac{1}{1+\alpha_2}$ | 0.69 |
| Rev. |       | ○     |       | ○     |       | $-\dfrac{1}{\alpha_2}$ | -2.22 |

|   | $C_1$ | $C_2$ | $C_3$ | $B_1$ | $B_2$ | GEAR RATIO | $\alpha_1=0.55$ $\alpha_2=0.45$ |
|---|---|---|---|---|---|---|---|
| 1st |   |   | ○ | ○ |   | $\dfrac{1-\alpha_2}{(1-\alpha_1)\alpha_2}$ | 2.72 |
| 2nd |   |   | ○ |   | ○ | $\dfrac{1}{(1-\alpha_1)(1+\alpha_2)}$ | 1.53 |
| 3rd | ○ | ○ |   |   |   | 1 | 1 |
| 4th | ○ |   |   |   | ○ | $\dfrac{1}{1+\alpha_2}$ | 0.69 |
| Rev. |   | ○ |   | ○ |   | $-\dfrac{1}{\alpha_2}$ | −2.22 |

|  | $C_1$ | $C_2$ | $C_3$ | $B_1$ | $B_2$ | GEAR RATIO | $\alpha_1=$ $\alpha_2=$ } 0.45 |
|---|---|---|---|---|---|---|---|
| 1st |  |  | ○ | ○ |  | $\dfrac{1-\alpha_2}{\alpha_2 \, \alpha_1}$ | 2.72 |
| 2nd |  |  | ○ |  | ○ | $\dfrac{1}{\alpha_2(1+\alpha_1)}$ | 1.53 |
| 3rd | ○ |  | ○ |  |  | 1 | 1 |
| 4th | ○ |  |  |  | ○ | $\dfrac{1}{1+\alpha_1}$ | 0.69 |
| Rev. |  | ○ |  | ○ |  | $-\dfrac{1}{\alpha_1}$ | −2.22 |

|  | $C_1$ | $C_2$ | $C_3$ | $B_1$ | $B_2$ | GEAR RATIO | $\alpha_1 = 0.45$<br>$\alpha_2 = 0.55$ |
|---|---|---|---|---|---|---|---|
| 1st |  |  | ◯ | ◯ |  | $\dfrac{\alpha_2}{\alpha_1(1-\alpha_2)}$ | 2.72 |
| 2nd |  |  | ◯ |  | ◯ | $\dfrac{1}{(1-\alpha_2)(1+\alpha_1)}$ | 1.53 |
| 3rd | ◯ |  | ◯ |  |  | 1 | 1 |
| 4th | ◯ |  |  |  | ◯ | $\dfrac{1}{1+\alpha_1}$ | 0.69 |
| Rev. |  | ◯ |  | ◯ |  | $-\dfrac{1}{\alpha_1}$ | −2.22 |

|  | $C_1$ | $C_2$ | $C_3$ | $B_1$ | $B_2$ | GEAR RATIO | $\alpha_1 =$<br>$\alpha_2 =$ } 0.45 |
|---|---|---|---|---|---|---|---|
| 1st |  |  | ○ | ○ |  | $\dfrac{1-\alpha_2}{\alpha_1 \alpha_2}$ | 2.72 |
| 2nd |  |  | ○ |  | ○ | $\dfrac{1}{\alpha_2(1+\alpha_1)}$ | 1.53 |
| 3rd | ○ |  | ○ |  |  | 1 | 1 |
| 4th | ○ |  |  |  | ○ | $\dfrac{1}{1+\alpha_1}$ | 0.69 |
| Rev. |  | ○ | ○ |  |  | $-\dfrac{1}{\alpha_1}$ | -2.22 |

|  | $C_1$ | $C_2$ | $C_3$ | $B_1$ | $B_2$ | GEAR RATIO | $\alpha_1 = 0.4$ $\alpha_2 = 0.55$ |
|---|---|---|---|---|---|---|---|
| 1st |  |  | ○ | ○ |  | $\dfrac{1}{1-\alpha_2}(1+\dfrac{\alpha_2}{\alpha_1})$ | 5.28 |
| 2nd |  |  | ○ |  | ○ | $\dfrac{1}{1-\alpha_2}$ | 2.22 |
| 3rd | ○ |  | ○ |  |  | 1 | 1 |
| 4th | ○ |  |  |  | ○ | $\dfrac{1}{1+\alpha_1}$ | 0.71 |
| Rev. |  | ○ |  | ○ |  | $-\dfrac{1}{\alpha_1}$ | −2.5 |

…

TRANSMISSION WITH OVERDRIVE

BACKGROUND OF THE INVENTION

1. Field of the Invention

The present invention relates to a transmission for an automotive vehicle and more particularly to a 4-speed transmission including an overdrive.

2. Description of the Prior Art

According to U.S. Pat. No. 2,725,762, a transmission using a compound planetary gear set to provide four forward speed ratios and one reverse speed ratio is known. The compound planetary gear set comprises a first sun gear, a second sun gear, a group of long planetary pinions which mesh with the first sun gear, a group of short planetary pinions which mesh with the second sun gear and a ring gear. A pinion carrier has two planetary shafts for rotatably mounting the long and short pinions. This compound planetary gear set, therefore, has four rotary elements.

The transmission comprises a drive shaft, a driven shaft and a hydraulic torque converter having an impeller connected to the drive shaft, a hollow turbine shaft connected to the turbine of the torque converter, and an intermediate shaft connected to the drive shaft.

One of the four rotary elements of the planetary gear set, that is, the ring gear, is connected permanently to the driven shaft, but the other three rotary elements thereof are not permanently connected to any of the other rotary shafts, that is, the turbine and intermediate shafts. Instead of providing the permanent connection, three clutches are associated with these three rotary elements. The sun gears are connected with the turbine shaft through clutches, respectively, and the carrier is connected with the intermediate shaft through a third clutch. Two brakes when engaged hold the first sun gear and the carrier, respectively.

If the clutches and brakes are operated in the following manner, this known transmission provides a first speed (low), a second speed (intermediate), a third speed (direct drive) and a fourth speed (overdrive).

In the first, second and third speeds, turbine power is fed to the second sun gear. The carrier is held during the first speed operation, and the first sun gear is held during the second speed operation. The third or direct drive is obtained when the third clutch is also engaged to connect the carrier with the intermediate shaft which is permanenetly connected to the drive shaft bypassing the torque converter. To obtain the fourth speed or overdrive, the clutch associated with the second sun gear is disengaged and the first sun gear is held by the associated brake with the third clutch kept engaged. During the overdrive operation, the second sun gear, together with its associated intermediate shaft, free wheels at an excessively high speed.

If a ratio ($\alpha_1$) of the number of teeth of the ring gear to the number of teeth of the first sun gear is assumed to be 0.5, and a ratio ($\alpha_2$) of the number of teeth of the ring gear to the number of teeth of the second sun gear is assumed to be 0.417, the rotational speed of the second sun gear can be expressed as $(1+\alpha) \times N$ where N is the rotational speed of the drive shaft. Thus, the second sun gear free wheels at a speed approximately 2.2 times that of the drive shaft and overspeeds the driven shaft during the overdrive operation. This means that when the drive shaft rotates at 6,000 rev./min, the second sun gear rotates at 13,200 rev./min.

Therefore, this transmission tends to experience vibration and durability problems because the second sun gear rotates at an excessively high speed in overdrive.

Another known transmission disclosed in Japanese patent specification (Tokkaisho) No. 51-9092 provides four speed ratios forward and one speed ratio reverse without causing any rotary element to rotate at excessively high speed. The transmission includes three simple planetary gear sets connected in tandem.

This known transmission is disadvantageous with respect to its weight, space and cost because three planetary gear sets have to be used.

An object of the present invention is therefore to provide a transmission which provides four forward speed ratios including an overdrive and one reverse speed ratio and having only two planetary gear sets, so that it has less weight and saves space and cost, and which has no rotary element that rotates at excessively higher speeds than the drive shaft, so that it is vibration free and durable over long use.

SUMMARY OF THE INVENTION

A transmission according to the present invention comprises two planetary gear sets, each having three rotary elements, viz., an input planetary gear set and an output planetary gear set. The input planetary gear set has a first element connected to a drive shaft, while, the output planetary gear set has an output element connected to a driven shaft. The output planetary gear set has a reaction element and an input element. The transmission comprises a brake which when engaged holds the reaction element of the output planetary gear set. The input planetary gear set has a second element connected permanently to the output planetary gear set and a third element. The transmission also comprises a bridging clutch which when engaged connects the third element to the output planetary gear set. The transmission further comprises means for connecting the input element of the output planetary gear set with the drive shaft for establishing a direct drive between the drive and driven shafts upon engagement of the bridging clutch and upon disengagement of the brake and for establishing an overdrive between the drive and driven shafts upon disengagement of the bridging clutch and upon engagement of the brake.

Because the input planetary gear set and the output planetary gear set cooperate with each other by means of one permanent connection and by means of the bridging clutch which is disengaged during overdrive operation, the transmission is light in weight, compact and can be manufactured at less cost.

BRIEF DESCRIPTION OF THE DRAWINGS

The various embodiments of the present invention are divided into 4 major Groups for ease of explanation.

DESCRIPTION OF THE PREFERRED EMBODIMENTS

Figures 1, 1A:
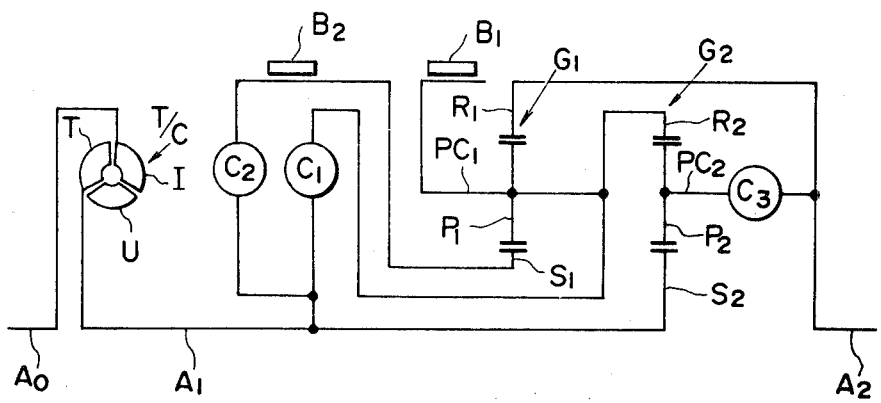
FIG. 1 is a schematic illustration of an embodiment of the invention falling within Group 1.
FIG. 1A is a table showing the engagement of the clutches and brakes asscociated with the embodiment of FIG. 1 to provide the various speed ratios.

Referring to the accompanying drawings, like reference numerals are used throughout all Figures to denote like parts.

All of the embodiments illustrated in FIGS. 1 through 15 are classified into the following four groups depending upon the similarlity in structure.

Figures 2, 2A:
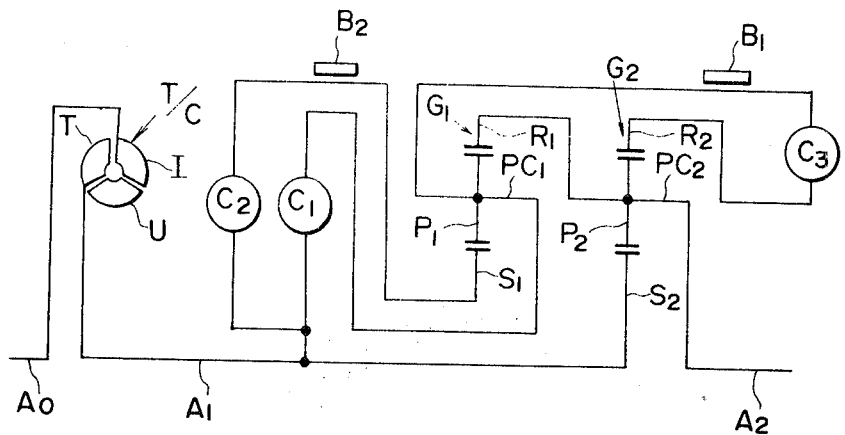
FIG. 2 is a schematic illustration of an embodiment of the invention falling within Group 2.
FIG. 2A is a table showing the engagement of the clutches and brakes associated with the embodiment of FIG. 2 to provide the various speed ratios.

Group 1 ... FIG. 1
Group 2 ... FIG. 2
Group 3 ... FIGS. 3~7
Group 4 ... FIGS. 8~15

The above classification has been made to facilitate understanding of the similarity between the embodiments.

Group 1 ... A transmission falling in this Group comprises two simple planetary gear sets connected in tandem using a bridging clutch and the bridging clutch is connected to a driven shaft of the transmission.

Referring to FIG. 1, an embodiment according to Group 1 is explained.

FIG. 1 EMBODIMENT

In FIG. 1, T/C denotes a hydraulic torque converter which has a pump impeller I connected to a drive shaft $A_0$, a turbine runner T connected to a turbine shaft $A_1$, and a stator U. The transmission also comprises a planetary gear train including an output planetary gear set $G_1$ and an input planetary gear set $G_2$ and a driven shaft $A_2$.

Referring to the planetary gear train, the output planetary gear set $G_1$ includes an output element in the form of a ring gear $R_1$, an input element in the form of a pinion carrier $PC_1$ and a reaction element in the form of a sun gear $S_1$. The output element $R_1$ of the output planetary gear set is connected permanently to the driven shaft $A_2$. The input planetary gear set $G_2$ includes a first element in the form of a sun gear $S_2$, a second element in the form of a ring gear $R_2$ and a third element in the form of a pinion carrier $PC_2$. The first element $S_2$ is connected to the drive shaft $A_0$ through the turbine shaft $A_1$ and the torque converter T/C. The second element $R_2$ is permanently connected to the input element $PC_1$ of the output planetary gear set $G_1$, while, the third element $PC_2$ is connected to the output element $R_1$ of the output planetary gear set $G_1$ through a bridging clutch $C_3$.

The transmission comprises a direct and overdrive clutch $C_1$ which when engaged connects the input element $PC_1$ of the output planetary gear set $G_1$ with the drive shaft $A_0$ through the torque converter T/C.

An intermediate and overdrive brake $B_2$ of the transmission holds when engaged the reaction element $S_1$ of the output planetary gear set $G_1$.

A low and reverse brake $B_1$ of the transmission holds when engaged the input element $PC_1$ of the output planetary gear set $G_1$.

A reverse clutch $C_2$ of the transmission connects the reaction element $S_1$ of the output planetary gear set $G_1$ with the drive shaft $A_0$ through the torque converter T/C.

The bridging clutch $C_3$ connects, when engaged, the third element $PC_2$ not only with the output element $R_1$ but also with the driven shaft $A_2$ because the output element $R_1$ of the output planetary gear set $G_1$ is connected permanently with the driven shaft $A_2$.

The carrier $PC_1$ of the output planetary gear set $G_1$ rotatably mounts a plurality of pinions $P_1$ meshing with the ring gear $R_1$ and with the sun gear $S_1$, thus forming a simple planetary gear set.

The carrier $PC_2$ of the input planetary gear set $G_2$ rotatably mounts a plurality of pinions $P_2$ meshing with the ring gear $R_2$ and with the sun gear $S_2$, thus forming a simple planetary gear set.

The sequence for the engagement and release of the clutches $C_1$, $C_2$, $C_3$ and the brakes $B_1$, $B_2$ in the transmission of FIG. 1 is illustrated in the Table of FIG. 1A, where, $\alpha_1$ denotes the ratio of the number of teeth of the ring gear $R_1$ to that of the sun gear $S_1$ and $\alpha_2$ the ratio of the number of teeth of the ring gear $R_2$ to that of the sun gear $S_2$. In this example, $\alpha_1 = \alpha_2 = 0.45$.

If the first speed ratio or low is desired, the bridging clutch $C_3$ is engaged and low and reverse brake $B_1$ is applied. Since the ring gear $R_2$ of the input planetary gear set $G_2$ is held by the brake $B_1$ and the carrier $PC_2$ rotates in unison with the driven shaft $A_2$, the power fed to the sun gear $S_2$ is delivered to the driven shaft $A_2$ through the carrier $PC_2$, thus rotating the driven shaft $A_2$ forwardly at a reduction speed. Thus, sun gear $S_1$ free wheels.

In making a shift from the first speed ratio to the second speed ratio or intermediate, the brake $B_1$ is released and the intermediate and overdrive brake $B_2$ is applied with the clutch $C_3$ kept engaged. Since the carrier $PC_1$ rotates in unison with the ring gear $R_2$ and since the sun gear $S_1$ is held, a torque delivery path is established through the planetary gear train during intermediate speed operation.

In making a shift to the direct drive, the clutch $C_1$ is engaged and brake $B_2$ is released with clutch $C_3$ kept engaged. Since the power is also fed to the ring gear $R_2$ and the carrier $PC_1$, both planetary gear sets $G_1$ and $G_2$ are locked and rotate in unison.

The bridging clutch $C_3$ which has been kept engaged during first, second and third speed ratios operation, is disengaged during the fourth speed ratio or overdrive operation. The overdrive is obtained when the direct and overdrive clutch $C_1$ is engaged and intermediate and overdrive brake $B_2$ is applied with all the other friction elements $C_2$, $C_3$, $B_1$ kept released. Since the sun gear $S_1$ is held and since the carrier $PC_1$ and ring gear $R_2$ are connected with the turbine shaft $A_1$, a torque delivery path is established through the output planetary gear set $R_1$. The input planetary gear set $G_2$ is locked and rotates in unison with the turbine shaft $A_1$.

The reverse speed ratio is obtained when the reverse clutch $C_2$ is engaged and low and reverse brake $B_1$ is applied with all other friction elements $C_1$, $C_3$ and $B_2$ kept released. Since the carrier $PC_1$ is held, the power fed to the sun gear $S_1$ causes the ring gear $R_1$ and driven shaft $A_2$ to rotate backwardly. The carrier $PC_2$ free wheels.

In the transmission system of FIG. 1, the rotary element which rotates at the maximum speed is the ring gear $R_1$ during overdrive ratio operation. In this example, the ring gear $R_1$ rotates at a speed 1.45 times that of the turbine shaft $A_1$ during overdrive ratio operation.

Since the ring gear $R_1$ rotates in unison with the driven shaft $A_2$, it will be appreciated that no rotary element overspeeds the driven shaft $C_3$ during overdrive ratio operation.

Group 2 . . . A transmission falling in this Group is similar to the Group 1 in that it comprises two simple planetary gear sets, but different in that a bridging clutch is connected to two rotary elements which are not directly connected to a driven shaft.

FIG. 2 EMBODIMENT

Referring to FIG. 2, an embodiment according to Group 2 is explained.

In FIG. 2, a transmission comprises a planetary gear train including an output planetary gear set $G_1$ and an input planetary gear set $G_2$ and a driven shaft $A_2$.

Referring to the planetary gear train, the output planetary gear set $G_1$ includes an output element in the form of a ring gear $R_1$, an input element in the form of a pinion carrier $PC_1$ and a reaction element in the form of a sun gear $S_1$. The output element $R_1$ of the output planetary gear set $G_1$ is connected permanently to the driven shaft $A_2$. The input planetary gear set $G_2$ includes a first element in the form of a sun gear $S_2$, a second element in the form of a pinion carrier $PC_2$ and a third element in the form of a ring gear $R_2$. The first element $S_2$ is connected to the drive shaft $A_0$ through the turbine shaft $A_1$ and the torque converter T/C. The second element $PC_2$ of the output planetary gear set $G_2$ is permanently connected to the input element $PC_1$ of the output planetary gear set $G_1$ and thus to the driven shaft $A_2$, while, the third element $R_2$ is connected to the input element $PC_1$ of the output planetary gear set $G_1$ through a bridging clutch $C_3$.

The transmission comprises a direct and overdrive clutch $C_1$ which when engaged connects the input element $PC_1$ of the output planetary gear set $G_1$ with the drive shaft $A_0$ through the torque converter T/C.

An intermediate and overdrive brake $B_2$ of the transmission holds when engaged the reaction element $S_1$ of the output planetary gear set $G_1$.

A low and reverse brake $B_1$ of the transmission holds when engaged the input element $PC_1$ of the output planetary gear set $G_1$.

A reverse clutch $C_2$ of the transmission connects the reaction element $S_1$ of the output planetary gear set $G_1$ with the drive shaft $A_0$ through the torque converter T/C.

The bridging clutch $C_3$ holds when engaged the third element $R_2$ with the input element $R_1$ of the output planetary gear set $G_1$.

The carrier $PC_1$ of the output planetary gear set $G_1$ rotatably mounts a plurality of pinions $P_1$ meshing with the ring gear $R_2$ and with the sun gear $S_2$, thus forming a simple planetary gear set.

The carrier $PC_2$ of the input planetary gear set $G_2$ rotatably mounts a plurality of pinions $P_2$ meshing with the ring gear $R_2$ and with the sun gear $S_2$, thus forming a simple planetary gear set.

The sequence for the engagement and release of the clutches $C_1$, $C_2$, $C_3$ and the brakes $B_1$, $B_2$ in the transmission of FIG. 2 is illustrated in the Table of FIG. 2A. In this example, $\alpha_1 = \alpha_2 = 0.45$ If the first speed ratio or low is desired, the bridging clutch $C_3$ is engaged and low and reverse brake $B_1$ is applied. Since the ring gear $R_2$ of the input planetary gear set $G_2$ is held, the power fed to the sun gear $S_2$ is delivered to the driven shaft $A_2$ through the carrier $PC_2$, thus rotating the driven shaft $A_2$ forwardly at a reduction speed. The carrier $PC_1$ and sun gear $S_1$ free wheel.

In making a shift from the first speed ratio to the second speed ratio or intermediate, the brake $B_1$ is released and the intermediate and overdrive brake $B_2$ is applied with the clutch $C_3$ kept engaged. Since the ring gear $R_2$ rotates in unison with the carrier $PC_1$ and since the sun gear $S_1$ is held, a torque delivery path is established in the planetary gear train during intermediate ratio operation.

In making an upshift to the direct drive, the clutch $C_1$ is engaged and the brake $B_2$ is released with the clutch $C_3$ kept engaged. Since the power is fed also to the ring gear $R_2$ through the carrier $PC_1$ and the bridging clutch $C_3$, both planetary gear sets $G_1$ and $G_2$ are locked and rotate in unison.

The bridging clutch $C_3$ which has been kept engaged during first, second and third speed ratio operations, is disengaged during the fourth speed ratio and overdrive operation. The overdrive is obtained when the direct and overdrive clutch $C_1$ is engaged and intermediate and overdrive brake $B_2$ is applied with all the other friction elements $C_2$, $C_3$, $B_1$ kept released. Since the sun gear $S_1$ is held and the power is fed to the pinion carrier $PC_1$, a torque delivery path is established through the output planetary gear set $G_1$. The ring gear $R_2$ free wheels.

The reverse speed ratio is obtained when the reverse clutch $C_2$ is engaged and low and reverse brake $B_1$ is applied with all the other friction elements $C_1$, $C_3$, $B_2$ kept released. Since the carrier $PC_1$ is held, the power fed to the sun gear $S_1$ causes the ring gear $R_1$ to rotate backwardly. The ring gear $R_2$ free wheels.

In the transmission system of FIG. 2, the rotary element which rotates at the maximum speed is the ring gear $R_2$ during overdrive ratio operation. In this example, the ring gear $R_2$ rotates at a speed 1.65 times that of the turbine shaft $A_1$.

Group 3 . . . A transmission falling in this Group is similar to that of Group 1 in that a bridging clutch is connected to a driven shaft, but is different from Group 1 in that it comprises a simple planetary gear set and a dual-pinion planetary gear set.

FIG. 3 EMBODIMENT

Figures 3, 3A:
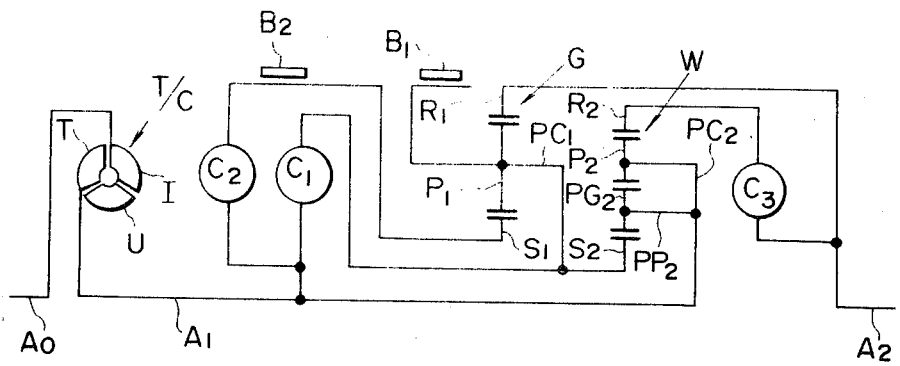
FIG. 3 is a first embodiment of the invention falling within Group 3.
FIG. 3A is a table showing the engagement of the clutches and brakes associated with the embodiment of FIG. 3 to provide the various speed ratios.

Referring to FIG. 3, a first embodiment according to Group 3 is explained.

In FIG. 3, T/C denotes a hydraulic torque converter which has a pump impeller I to which a drive shaft $A_0$ is connected, a turbine runner T to which a turbine shaft $A_1$ is connected, and a stator U. The transmission comprises a planetary gear train including an output planetary gear set G and an input planetary gear set W and a driven shaft $A_2$.

Referring to the planetary gear train, the output planetary gear train G includes an output element in the form of a ring gear $R_1$, an input element in the form of a sun gear $S_1$ and a reaction element in the form of a pinion carrier $PC_1$. The output element $R_1$ of the output planetary gear set G is connected permanently to the driven shaft $A_2$. The input planetary gear set W includes a first element in the form of a pinion carrier $PC_2$, a second element in the form of a sun gear $S_2$ and a third element in the form of a ring gear $R_2$. The first element $PC_2$ is connected to the drive shaft $A_0$ through the turbine shaft $A_1$ and the torque converter T/C. The second element $S_2$ is permanently connected to the input element $PC_1$ of the output planetary gear set G, while, the third element $R_2$ is connected to the output element of the output planetary gear set G through a bridging clutch $C_3$.

The transmission comprises a direct and overdrive clutch $C_1$ which when engaged connects the input element $PC_1$ of the output planetary gear set G with the drive shaft $A_0$ through the turbine shaft $A_1$ and the torque converter T/C.

An intermediate and overdrive brake $B_2$ of the transmission holds when engaged the reaction element $S_1$ of the output planetary gear set G.

A low and reverse brake $B_1$ of the transmission holds when engaged the input element $PC_1$ of the output planetary gear set G.

A reverse clutch $C_2$ of the transmission connects when engaged the reaction element $S_1$ of the output planetary gear set G with the drive shaft $A_0$ through the turbine shaft $A_1$ and the torque converter T/C.

The bridging clutch $C_3$ connects when engaged the third element $PC_2$ not only with the output element $R_1$ but also with the driven shaft $A_2$.

The carrier $PC_1$ of the output planetary gear set G rotatably mounts a plurality of pinions $P_1$ meshing with the ring gear $R_1$ and with the sun gear $S_1$, thus forming a simple planetary gear set.

The carrier $PC_2$ of the input planetary gear set W rotatably mounts a plurality of first pinions $P_2$ meshing with the ring gear $R_2$ and a plurality of second pinions $PG_2$ meshing with the sun gear $S_2$ and the mating first pinions $P_2$, thus forming a dual-pinion planetary gear set.

The sequence for the engagement and release of the clutches $C_1$, $C_2$, $C_3$ and the brakes $B_1$, $B_2$ in transmission of FIG. 3 is illustrated in the Table of FIG. 3A. In this example, $\alpha_1 = \alpha_2 = 0.5$.

When the first gear ratio or low is desired, the bridging clutch $C_3$ is engaged and low and reverse brake $B_1$ is applied. Since the sun gear $S_2$ of the input planetary gear set W is held by the brake $B_1$ and the ring gear $R_2$ rotates in unison with the driven shaft $A_2$, the power fed to the sun gear $S_2$ is delivered to the driven shaft $A_2$ through the ring gear $R_2$. The sun gear $S_1$ free wheels.

In making a shift from the first speed ratio to the second speed ratio or intemediate, the brake $B_1$ is released and the intermediate and overdrive brake $B_2$ is applied with the clutch $C_3$ kept engaged. Since the carrier $PC_1$ rotates in unison with the sun gear $S_2$ and since the sun gear $S_1$ is held, a torque delivery path is established through the planetary gear train during the intermediate speed operation.

In making a shift to the direct drive, the brake $B_2$ is released and the clutch $C_1$ is engaged with the clutch $C_3$ kept engaged. Since the power is fed also to the sun gear $S_2$, both planetary gear sets G and W are locked and rotate in unison.

The bridging clutch $C_3$ which has been kept engaged during first, second and third speed ratios operation, is disengaged during the fourth speed ratio or overdrive operation. The overdrive is obtained when the direct and overdrive clutch $C_1$ is engaged and intermediate and overdrive brake $B_2$ is applied with all the other friction elements $C_2$, $C_3$, $B_1$ kept released. Since the sun gear $S_1$ is held and since the carrier $PC_1$ is connected with the turbine shaft $A_1$, a torque delivery path is established through the output planetary gear set G. The input planetary gear set W is locked and rotates in unison with the turbine shaft $A_1$.

The reverse speed ratio is obtained when the reverse clutch $C_2$ is engaged and the low and reverse brake $B_1$ is applied with all other friction elements $C_1$, $C_3$ and $B_2$ kept released. Since the carrier $PC_1$ is held, the power fed to the sun gear $S_1$ causes the ring gear $R_1$ and driven shaft $A_1$ to rotate backwardly. The ring gear $R_2$ free wheels.

In the transmission system of FIG. 3, the rotary element which rotates at the maximum speed is the ring gear $R_1$ during overdrive ratio operation. In this example, the ring gear $R_1$ rotates at a speed 1.5 times that of the turbine shaft $A_1$ during overdrive ratio operation.

Since the ring gear $R_1$ rotates in unison with the driven shaft $A_2$, it will be appreciated that no rotary element overspeeds the driven shaft $A_2$ during overdrive ratio operation.

FIG. 4 EMBODIMENT

Figures 4, 4A:
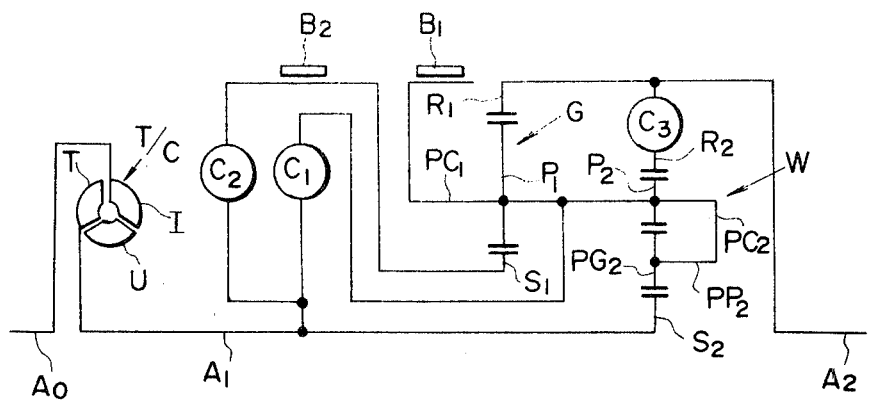
FIG. 4 is a schematic illustration of a second embodiment of the invention falling with in Group 3.
FIG. 4A is a table showing the engagement of the clutches and brakes associated with the embodiment of FIG. 4 to provide the various speed ratios.

Referring to FIG. 4, a second embodiment according to Group 3 is explained.

This embodiment is substantially similar to the embodiment illustrated in FIG. 3, except that a first element of an input planetary gear set W is in the form of a sun gear $S_2$ and a second element thereof is in the form of a pinion carrier $PC_2$.

The sequence for the engagement and release of clutches $C_1$, $C_2$, $C_3$ and brakes $B_1$, $B_2$ in the transmission system of FIG. 4 is illustrated in the Table of FIG. 4A. In this example, $\alpha_1 = 0.45$ and $\alpha_2 = 0.4$.

When the first speed ratio or low is desired, the bridging clutch $C_3$ is engaged and the low and reverse brake $B_1$ is applied. Since the pinion carrier $PC_2$ of the input planetary gear set W is held and the sun gear $S_2$ rotates in unison with the turbine shaft $A_1$, a torque delivery path is established through the input planetary gear set W, thus rotating the driven shaft $A_2$ forwardly at a reduction speed. The sun gear $S_1$ of the output planetary gear set free wheels.

In making a shift from the first speed ratio to the second speed ratio or intermediate, the brake $B_1$ is released and the intermediate and overdrive brake $B_2$ is applied with the clutch $C_3$ kept engaged. Since the carrier $PC_1$ rotates in unison with the carrier $PC_2$ and the sun gear $S_1$ is held, a torque delivery path is established during intermediate speed operation.

In making a shift to the third speed ratio or the direct drive, the brake $B_2$ is released and the direct and overdrive clutch $C_1$ is engaged with the bridging clutch $C_3$ kept engaged. Since the turbine power is also fed to the carrier $PC_2$, both planetary gear sets G and W are locked and rotate in unison.

The bridging clutch $C_3$ which has been kept engaged during first, second and third speed ratio operations, is disengaged during the fourth and overdrive ratio operation. The overdrive is obtained when the direct and overdrive clutch $C_1$ is engaged and intermediate and overdrive brake $B_1$ is applied with all the other friction elements $C_2$, $C_3$, $B_1$ kept engaged. Since the sun gear $S_1$ is held and since the pinion carrier $PC_1$ is connected with the turbine shaft $A_1$, a torque delivery path is established through the output planetary gear set G. Since the turbine power is also fed to the carrier $PC_2$, the input planetary gear set W is locked and rotate in unison with the turbine shaft $A_1$.

The reverse speed ratio is obtained when the reverse clutch $C_2$ is engaged and low and reverse brake $B_1$ is applied with all the other friction elements $C_1$, $C_3$ and $B_2$ kept released. The ring gear $R_2$ free wheels.

In the transmission system of FIG. 4, the rotary element which rotates at the maximum speed is the ring gear $R_1$ during overdrive ratio operation. In this example, the ring gear $R_1$ rotates 1.45 times that of the turbine shaft $A_1$ during overdrive ratio operation.

Since the ring gear $R_1$ rotates in unison with the driven shaft $A_2$, it will be appreciated that no rotary element overspeeds the driven shaft $A_2$ during overdrive ratio operation.

FIG. 5 EMBODIMENT

Figures 5, 5A:
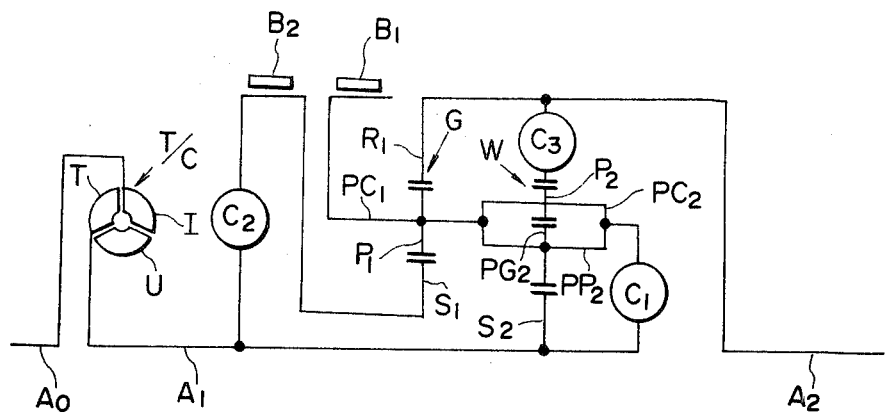
FIG. 5 is a schematic illustration of a third embodiment of the invention falling within Group 3.
FIG. 5A is a table showing the engagement of the clutches and brakes associated with the embodiment of FIG. 5 to provide the various speed ratios.

Referring to FIG. 5, a third embodiment of Group 3 is explained.

This embodiment is substantially the same as the embodiment illustrated in FIG. 3 in its interconnecting relationships, but is different therefrom in that a pinion carrier $PC_2$ of an input planetary gear set W is connected on one side to a pinion carrier $PC_1$ of an output planetary gear set G and connected on the opposite to a friction element of a direct and overdrive clutch $C_1$ which is connected to a turbine shaft at a portion rearwardly of a junction between a sun gear $S_2$ and the turbine shaft $A_1$.

The sequence for the engagement and release of clutches $C_1$, $C_2$, $C_3$ and brakes $B_1$, $B_2$ in the transmission of FIG. 5 is illustrated in the Table of FIG. 5A. In this example, $\alpha_1 = \alpha_2 = 0.45$.

A torque delivery path established in each speed ratio is the same as that of the transmission system illustrated in FIG. 3.

In the transmission system of FIG. 5, the rotary element which rotates at the maximum speed is the ring gear $R_1$ during overdrive ratio operation. In this example, the ring gear $R_1$ rotates at a speed 1.45 times that of the turbine shaft $A_1$.

It will be appreciated that in the transmission system of FIG. 5, there is no rotary element which overspeeds the driven shaft $A_2$ during overdrive ratio operation.

FIG. 6 EMBODIMENT

Figures 6, 6A:
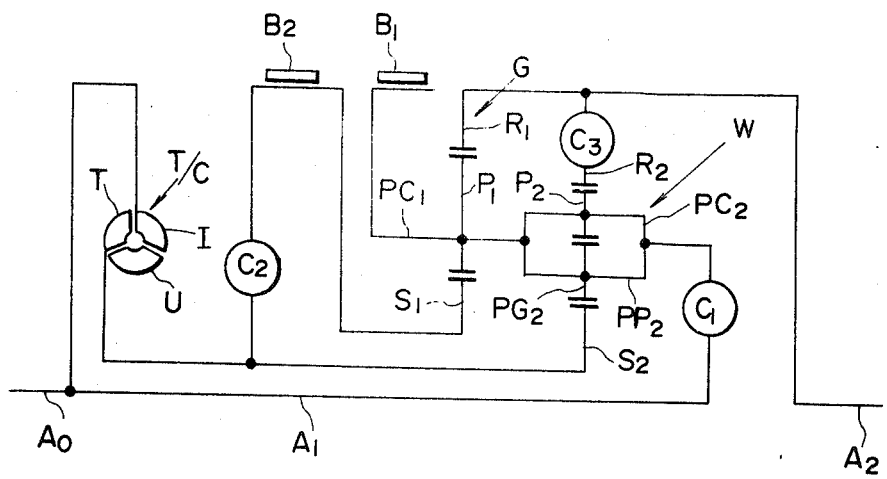
FIG. 6 is a schematic illustration of a fourth embodiment of the invention falling within Group 3.
FIG. 6A is a table showing the engagement of the clutches and brakes associated with the embodiment of FIG. 6 to provide the various speed ratios.

Referring to FIG. 6, a fourth embodiment of Group 3 is explained.

This embodiment is substantially similar to the embodiment illustrated in FIG. 5, except that a direct and overdrive clutch $C_1$ is connected to a drive shaft $A_0$ rather than a turbine shaft $A_1$ to connect when engaged a carrier $PC_2$ with the drive shaft $A_0$, bypassing a torque converter T/C.

The sequence for the engagement and release of clutches $C_1$, $C_2$, $C_3$ and brakes $B_1$, $B_2$ in the transmission of FIG. 6 is illustrated in the Table of FIG. 6A. In this example, $\alpha_1 = \alpha_2 = 0.45$.

Since the direct and overdrive clutch $C_1$ is released during first, second and reverse speed ratio operations, a torque delivery path in each of these speed ratio operations is the same as that of the transmission FIG. 5 or FIG. 4.

During a third speed operation when the clutch $C_1$ and bridging clutch $C_3$ are engaged with all the other friction elements kept released, an input element in the form of a carrier $PC_1$ of an output planetary gear set G is connected with the driven shaft through the carrier $PC_2$ and bypassing the torque converter T/C. In this speed ratio, the mechanical torque transmission ratio is 55%.

The fourth speed ratio or overdrive is obtained when the clutch $C_1$ is engaged and brake $B_2$ applied with all the other friction elements kept released. Since the power is fed from the driven shaft $A_0$ directly to the carrier $PC_1$ bypassing the torque converter T/C, and sun gear $S_1$ is held by the brake $B_2$, a torque delivery path through the output planetary gear set G is established. The mechanical torque transmission ratio then is 100%. The ring gear $R_2$ free wheels.

In the transmission system of FIG. 6, the rotary element which rotates at the maximum speed is the ring gear $R_1$ during overdrive ratio operation. In this example, the ring gear $R_1$ rotates at a speed 1.45 times that of the drive shaft $A_0$.

Since the ring gear $R_1$ rotates in unison with the driven shaft $A_2$, it will be appreciated that there is no rotary element which overspeeds the driven shaft $A_2$ during overdrive ratio operation.

FIG. 7 EMBODIMENT

Figures 7, 7A:
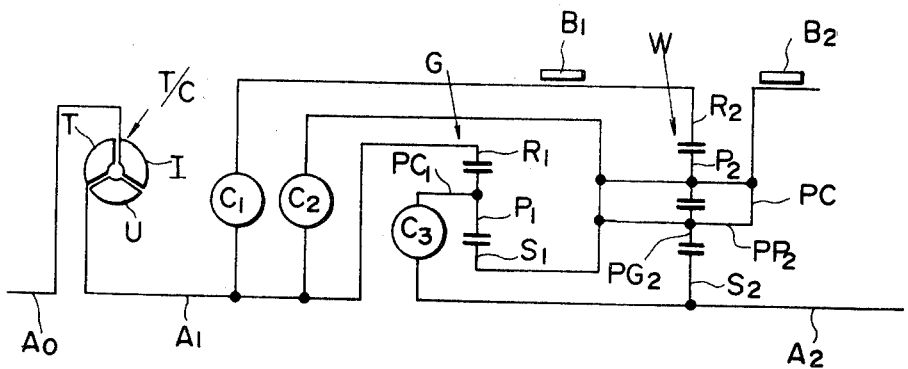
FIG. 7 is a schematic illustration of a fifth embodiment of the invention falling within Group 3.
FIG. 7A is a table showing the engagement of the clutches and brakes associated with the engagement of FIG. 7 to provide the various speed ratios.

Referring to FIG. 7, a fifth embodiment of Group 3 is explained.

In FIG. 7, a planetary gear train comprises an output planetary gear set W and an input planetary gear set G. The output planetary gear set W includes an output element in the form of a sun gear $S_2$, an input element in the form of a ring gear $R_2$ and a reaction element in the form of a carrier $PC_2$. The output element $S_2$ of the output planetary gear set W is connected permenently to the driven shaft $A_2$. The input planetary gear set G includes a first element in the form of a ring gear $R_1$, a second element in the form of a sun gear $S_1$ and a third element in the form of a pinion carrier $PC_1$. The first element $R_1$ is connected to a drive shaft $A_0$ through the turbine shaft $A_1$ and the hydraulic torque converter T/C. The second element $S_1$ is permanently connected to the reaction element $PC_2$ of the output planetary gear set W, while, the third element $PC_1$ is connected to the output element $S_2$ of the output planetary gear set W through a bridging clutch $C_3$.

The transmission comprises a direct and overdrive clutch $C_1$ which when engaged connects the input element $R_2$ of the output planetary gear set W with the drive shaft $A_0$ through the turbine shaft $A_1$ and torque converter T/C.

An intermediate and overdrive brake $B_1$ of the transmission holds when engaged the reaction element $PC_2$ of the output planetary gear set W.

A low and reverse brake $B_1$ of the transmission holds when engaged the input element $R_2$ of the output planetary gear set W.

A reverse clutch $C_2$ of the transmission connects when engaged the reaction element $PC_2$ of the output planetary gear set W with the drive shaft $A_0$ through the turbine shaft $A_1$ and the torque converter T/C.

The bridging clutch $C_3$ connects when engaged the third element $PC_1$ not only with the output element $S_2$ but also with the driven shaft $A_2$.

The carrier $PC_2$ of the output planetary gear set W rotatably mounts a plurality of first pinions $P_2$ on shafts $PP_2$ meshing with the ring gear $R_2$, and a plurality of second pinions $PG_2$ meshing with the sun gear $S_2$ and with the mating first pinion $P_2$, thus forming a dual-pinion planetary gear set.

The carrier $PC_1$ of the input planetary gear set G rotatably mounts a plurality of pinions $P_1$ meshing with the ring gear $R_1$ and with the sun gear $S_1$, thus forming a simple planetary gear set G.

The sequence for the engagement and release of clutches $C_1$, $C_2$, $C_3$ and brakes $B_1$, $B_2$ in the transmission of FIG. 7 is illustrated in the Table of FIG. 7A. In this example, $\alpha_1 = 0.5$ and $\alpha_2 = 0.7$.

When the first speed ratio or low is desired, the bridging clutch $C_3$ is engaged and low and reverse brake $B_1$ is applied. Since the sun gear $S_1$ rotates in unison with the carrier $PC_2$ and since the ring gear $R_2$ is held, a torque delivery path is established through the planetary gear train during the first speed ratio.

In making a shift from the first speed ratio to the second speed ratio or intermediate, the brake $B_1$ is released and the intermediate and overdrive brake $B_2$ is applied with the clutch $C_3$ kept engaged. Since the carrier $PC_1$ is held, a torque delivery path is established through the input planetary gear set G. The ring gear $R_2$ free wheels.

In making a shift to the third speed ratio or direct drive, the brake $B_2$ is released and the clutch $C_3$ kept engaged. Since the power is fed to the ring gear $R_2$ and also to the ring gear $R_1$ and since the carrier $PC_1$ and sun gear $S_1$ rotate in unison with the sun gear $S_2$ and with the carrier $PC_2$, both of the output and input planetary gear sets G and W are locked and rotate in unison with the turbine shaft $A_1$.

The bridging clutch $C_3$ which has been kept engaged during first, second and third speed ratio operations, is disengaged during the fourth speed ratio or overdrive operation. The overdrive is obtained when the direct and overdrive clutch $C_1$ is engaged and the brake $B_2$ is applied with the other friction elements kept released. Since the carrier $PC_2$ is held and ring gear $R_1$ is connected with the turbine shaft $A_1$, a torque delivery path is established through the output planetary gear set W. The carrier $PC_1$ free wheels.

The reverse speed ratio is obtained when the reverse clutch $C_2$ is engaged and low and reverse brake $B_1$ is applied with all other friction elements kept released. Since the ring gear $R_2$ is held and the carrier $PC_2$ is connected with the turbine shaft $A_1$, a torque delivery path is established through the output planetary gear set W, thus rotating the driven shaft $A_2$ backwardly.

In the transmission system of FIG. 7, the rotary element which rotates at the maximum speed is the sun gear $S_2$ during overdrive ratio operation. In this example, the sun gear $S_2$ rotates at a speed 1.43 times that of the turbine shaft $A_1$.

Since the sun gear $S_2$ rotates in unison with the driven shaft $A_2$, it will be appreciated that no rotary element overspeeds the driven shaft $A_2$ during overdrive ratio operation.

Group 4 . . . A transmission falling in the Group is similar to that of Group 1 in that a bridging clutch is connected between two rotary elements which are not a driven shaft, but is different from Group 1 in that it comprises a simple planetary gear set and a dual-pinion planetary gear set.

FIG. 8 EMBODIMENT

Figures 8, 8A:
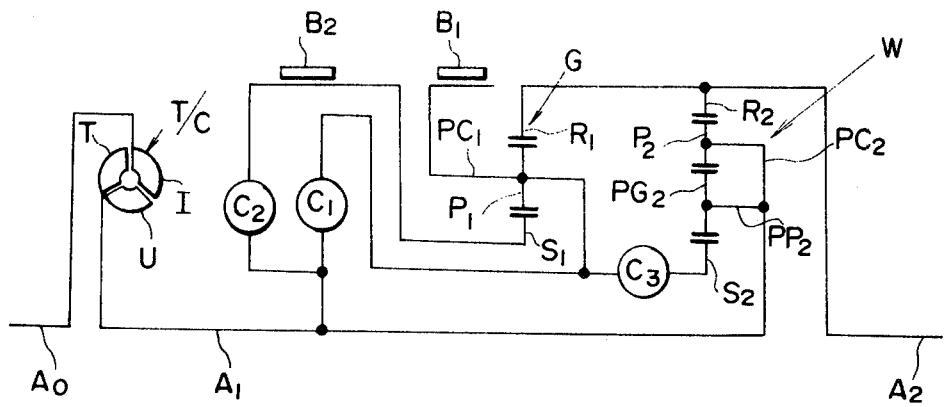
FIG. 8 is a schematic illustration of a first embodiment of the invention falling within Group 4.
FIG. 8A is a table showing the engagement of the clutches and brakes associated with the embodiment of FIG. 8 to provide the various speed ratios.

Referring to FIG. 8, a first embodiment according to Group 4 is explained.

In FIG. 8, T/C denotes a hydraulic torque converter which has a pump impeller I to which a drive shaft $A_0$ is connected, a turbine runner T to which a turbine shaft $A_1$ is connected and a stator U. The transmission comprises a planetary gear train including an output planetary gear set G and an input planetary gear set W and a driven shaft $A_2$.

Referring to the planetary gear train, the output planetary gear set includes an output element in the form of a ring gear $R_1$, an input element in the form of a sun gear $S_1$ and a reaction element in the form of a pinion carrier $PC_1$. The output element $R_1$ of the output palnetary gear set G is connected permanently to the driven shaft $A_2$. The input planetary gear set W includes a first element in the form of a pinion carrier $PC_2$, a second element in the form of a ring gear $R_2$ and a third element in the form of a sun gear $S_2$. The first element $PC_2$ is connected to the drive shaft $A_0$ through the turbine shaft $A_1$ and the torque converter T/C. The second element $R_2$ is permanently connected to the input element $R_1$ of the output planetary gear set G, while, the third element $S_2$ is connected to the input element $PC_1$ of the output planetary gear set G through a bridging clutch $C_3$.

The transmission comprises a direct and overdrive clutch $C_1$ which when engaged connects the input element $PC_1$ connects when engaged the input element $PC_1$ of the output planetary gear set G with the drive shaft $A_0$ through the torque converter T/C.

An intermediate and overdrive brake $B_2$ of the transmission holds when engaged the reaction element $S_1$ of the output planetary gear set G.

A low and reverse brake $B_1$ of the transmission holds when engaged the input element $PC_1$ of the output planetary gear set G.

A reverse clutch $C_2$ of the transmission connects when engaged the reaction element $S_1$ with the drive shaft $A_0$ through the turbine shaft $A_1$ and the torque converter T/C.

The bridging clutch $C_3$ connects when engaged the third element $S_2$ with the input element $PC_1$ of the output planetary gear set G.

The carrier $PC_1$ of the output planetary gear set G rotatably mounts a plurality of pinions $P_1$ meshing with the ring gear $R_1$ and with the sun gear $S_1$, thus forming a simple planetary gear set.

The carrier $PC_2$ of the input planetary gear set W rotatably mounts a plurality of first pinions $P_2$ on shafts $PP_2$ meshing with the ring gear $R_2$ and a plurality of second pinions $PG_2$ meshing with the sun gear and with the mating first pinion, thus forming a dual-pinion planetary gear set.

The sequence for the engagement and release of the clutches $C_1$, $C_2$, $C_3$ and brakes $B_1$, $B_2$ in the transmission of FIG. 8 is illustrated in the Table 8A. In this example, $\alpha_1 = 0.45$ and $\alpha_2 = 0.6$ When the first gear ratio or low is desired, the bridging clutch $C_3$ is engaged and low and reverse brake $B_1$ is applied. Since the sun gear $S_2$ is held and the carrier $PC_2$ rotates in unison with the turbine shaft $A_1$, a torque delivery path is established through the input planetary gear set W. The sun gear $S_1$ free wheels.

In making a shift from the first speed to the second speed ratio or intermediate, the brake $B_1$ is released and the intermediate and overdrive brake $B_2$ is applied with the clutch $C_3$ kept engaged. Since the carrier $PC_1$ rotates in unison with the carrier $PC_2$ and since the sun gear $S_1$ is held, a torque delivery path is established through a planetary gear train during the intermediate speed operation.

In making a shift to the direct drive, the brake $B_2$ is released and the clutch $C_1$ is engaged with the clutch $C_3$ kept engaged. Since the power is fed also to the sun gear $S_2$, both planetary gear sets G and W are locked and rotate in unison.

The bridging clutch $C_3$ which has been kept engaged during first, second and third speed ratio operations, is disengaged during the fourth speed ratio or overdrive operation. The overdrive is obtained when the direct and overdrive clutch $C_1$ is engaged and intermediate and overdrive brake $B_2$ is applied with all the other friction elements $C_2$, $C_3$, $B_1$ kept released. Since the sun gear $S_1$ is held and since the carrier $PC_1$ is connected with the turbine shaft $A_1$, a torque delivery path is established through the output planetary gear set G. Since the clutch $C_3$ is disengaged, the sun gear $S_2$ free wheels.

The reverse speed ratio is obtained when the reverse clutch $C_2$ is engaged and the brake $B_1$ is applied with all the other friction elements kept released. Since the carrier $PC_1$ is held, forward rotation of the sun gear $S_1$ causes the ring gear $R_1$ to rotate backwardly. The sun gear $S_2$ free wheels.

In the transmission system of FIG. 8, the rotary element which rotates at the maximum speed is the sun gear $S_2$ during overdrive ratio operation. In this example, the sun gear $S_2$ rotates at a speed 1.75 times that of the turbine shaft $A_1$.

FIG. 9 EMBODIMENT

Figures 9, 9A:
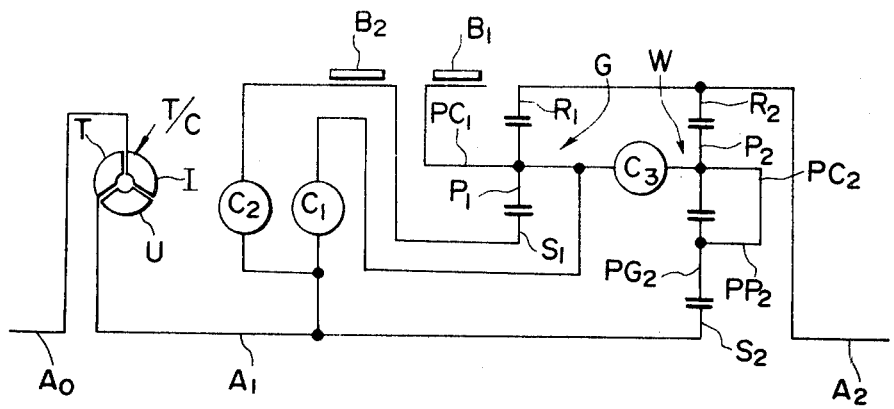
FIG. 9 is a schematic illustration of a second embodiment of the invention falling within Group 4.
FIG. 9A is a table showing the engagement of the clutches and brakes associated with the embodiment of FIG. 9 to provide the various speed ratios.

Referring to FIG. 9, a second embodiment of Group 4 is explained.

This embodiment is different from the embodiment illustrated in FIG. 8 in that an input planetary gear set W has a sun gear $S_2$ connected to a turbine shaft $A_1$ and a pinion carrier $PC_2$ connected with a pinion carrier of an output planetary gear set G through a bridging clutch $C_3$ so that the sun gear $S_2$ is regarded as a first element, the carrier $PC_2$ as a third element and a ring gear $R_2$ as a second element.

The sequence for the engagement of clutches $C_1$, $C_2$, $C_3$ and brakes $B_1$, $B_2$ in transmission system of FIG. 9 is illustrated in the Table of FIG. 9A. In this example, $\alpha_1 = 0.45$, $\alpha_2 = 0.4$.

When the first speed ratio or low is desired, the bridging clutch $C_3$ is engaged and low and reverse brake $B_1$ is applied. Since the carrier $PC_2$ of the input planetary gear set W is held and the sun gear $S_2$ rotates in unison with the turbine shaft $A_1$, a torque delivery path is established through the input planetary gear set W. The sun gear $S_1$ free wheels.

In making a shift from the first speed ratio to the second speed ratio or intermediate, the brake $B_1$ is released and the intermediate and overdrive brake $B_2$ is applied with the clutch $C_3$ kept engaged. Since the carrier $PC_1$ rotates in unison with the carrier $PC_2$ and since the sun gear $S_1$ is held, a torque delivery path is established through the planetary gear train during the intermediate ratio operation.

The third speed ratio or direct drive is obtained when the direct and overdrive clutch $C_1$ is engaged and bridging clutch $C_3$ is engaged with all other friction elements $C_2$, $B_1$, $B_2$ kept released. Since the turbine power is fed to the carrier $PC_2$ also, both planetary gear sets G and W are locked and rotate in unison.

The briding clutch $C_3$ which has been kept engaged during the first, second and third speed ratio operations, is disengaged during the fourth or overdrive operation. The overdrive is obtained when the direct and overdrive clutch $C_1$ is engaged and intermediate and overdrive brake $B_2$ is applied with all other friction elements $C_2$, $C_3$, $B_1$ kept released. Since the sun gear $S_1$ is held and since the carrier $PC_1$ is connected with the turbine shaft $A_1$, a torque delivery path is established through the output planetary gear set G. The pinion carrier $PC_2$ free wheels.

The reverse speed ratio is obtained when the reverse clutch $C_2$ is engaged and low and reverse brake $B_1$ is applied with all the other friction elements $C_1$, $C_3$, $B_2$ kept released. Since the carrier $PC_1$ is held, the power fed to the sun gear $S_1$ causes the ring gear $R_1$ to rotate backwardly. The carrier $PC_1$ free wheels.

In the transmission system of FIG. 9, the rotary element which rotates at the maximum speed is the carrier $PC_1$ during overdrive ratio operation. In this example, the carrier $PC_2$ rotates at a speed 1.75 times that of the turbine shaft $A_1$.

FIG. 10 EMBODIMENT

Figures 10, 10A:
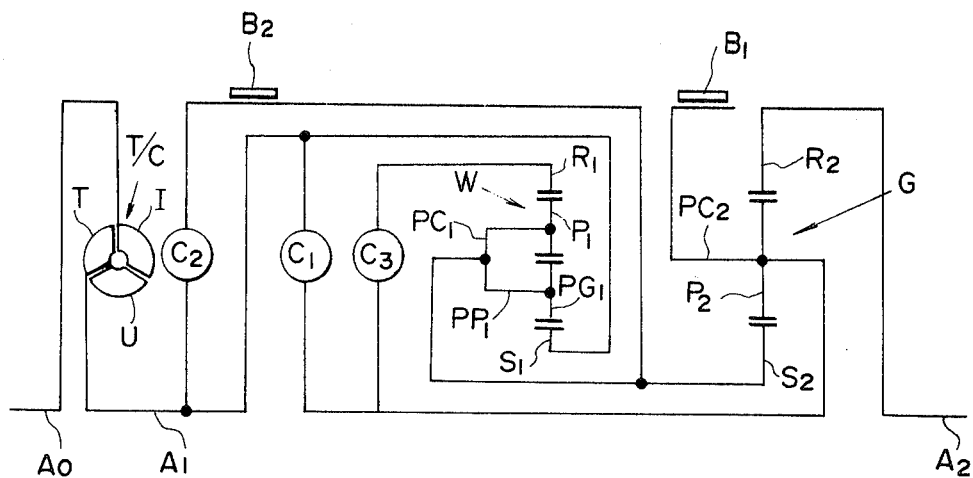
FIG. 10 is a schematic illustration of a third embodiment of the invention falling within Group 4.
FIG. 10A is a table showing the engagement of the clutches and brakes associated with the embodiment of FIG. 10 to provide the various speed ratios.

Referring to FIG. 10, a third embodiment of Group 4 is explained.

In FIG. 10, T/C denotes a hydraulic torque converter which has a pump impeller I to which a drive shaft $A_0$ is connected, a turbine runner T to which a turbine shaft $A_1$ is connected, and a stator U. The transmission comprises a planatary gear train including an output planetary gear set G in the form of a simple planetary gear set and an input planetary gear set W in the form of a dual-pinion planetary gear set, and a driven shaft $A_2$.

Referring to the planetary gear train, the output planetary gear set $G_1$ includes an output element in the form of a ring gear $R_2$, an input element in the form of a pinion carrier $PC_1$ and a reaction element in the form of a sun gear $S_2$. The output element $R_2$ of the output planetary gear set G is connected permanently to the driven shaft $A_2$. The input planetary gear set W includes a first element in the form of a sun gear $S_1$, a second element in the form of a pinion carrier $PC_1$ and a third element in the form of a ring gear $R_1$. The first element $S_1$ is connected to the drive shaft $A_0$ through the turbine shaft $A_1$ and torque converter T/C. The second element $PC_1$ is permanently connected to the reaction element $S_2$ of the output planetary gear set G, while, the third element $R_1$ is connected to the input element $PC_2$ of the output planetary gear set G through a bridging clutch $C_3$.

The transmission comprises a direct and overdrive clutch $C_1$ which when engaged connects the input element $PC_2$ of the output planetary gear set G with the drive shaft $A_0$ through the torque converter T/C.

An intermediate and overdrive brake $B_2$ of the transmission holds when engaged the reaction element $S_2$ of the output planetary gear set G.

A low and reverse brake $B_1$ of the transmission holds when engaged the input element $PC_2$ of the output planetary gear set G.

A reverse clutch $C_2$ conects the reaction element $S_2$ of the output planetary gear set G with the drive shaft $A_0$ through the torque converter T/C.

The bridging clutch $C_3$ connects when engaged the third element $R_1$ of the input planetary gear set W with the input element $PC_2$ of the output planetary gear set G.

The sequence for the engagement and release of the clutches $C_1$, $C_2$, $C_3$ and brakes $B_1$, $B_2$ in the transmission of FIG. 10 is illustrated in the Table of FIG. 10A. In this example, $\alpha_1 = \alpha_2 = 0.45$.

When the first speed ratio or low is desired, the bridging clutch $C_3$ is engaged and low and reverse brake $B_1$ is applied. Since the pinion carrier $PC_2$ and ring gear $R_1$ are held and since the carrier $PC_1$ rotates in unison with the sun gear $S_2$, a torque delivery path is established through the planetary gear train.

In making a shift from the first speed ratio to the second speed ratio or intermediate, the brake $B_1$ is released and the intermediate and overdrive brake $B_2$ is applied with the clutch $C_3$ kept engaged. Since the pinion carrier $PC_1$ and sun gear $S_2$ are held and since the ring gear $R_1$ rotates in unison with the carrier $PC_2$, a torque delivery path is established.

In making a shift to the third speed ratio or direct drive, the direct and overdrive clutch $C_1$ is engaged and brake $B_2$ is released with clutch $C_3$ kept engaged. Since the power is fed also to the ring gear $R_1$ through the clutches $C_1$ and $C_3$, both planetary gear sets are locked and rotate in unison.

The bridging clutch $C_3$ which has been kept engaged during first, second and third speed ratio operations, is disengaged during the fourth speed ratio or overdrive operation. The overdrive is obtained when the direct and overdrive clutch $C_1$ is engaged and intermediate and overdrive brake $B_2$ is applied with all the other friction elements $C_2$, $C_3$, $B_1$ kept released. Since the sun gear $S_2$ is held and since power is fed to the carrier $PC_2$, a torque delivery path is established through the output planetary gear set G. The ring gear $R_1$ free wheels.

The reverse speed ratio is obtained when the reverse clutch $C_2$ is engaged and low and reverse brake $B_1$ is applied with all the other friction elements $C_1$, $C_3$, $B_2$ kept released. Since the power is fed to the sun gear $S_2$ and since the pinion carrier $PC_2$ is held, the driven shaft $A_2$ rotates backwardly. The ring gear $R_1$ free wheels.

In the transmission system of FIG. 10, the rotary element which rotates at the maximum speed is the ring gear $R_2$ during overdrive ratio operation. In this example, the ring gear $R_2$ rotates at a speed 1.45 times that of thr turbine shaft $A_1$ during the overdrive ratio operation.

Since the ring gear $R_2$ rotates in unison with the driven shaft $A_2$, it will be appreciated that there is no rotary element which overspeeds the driven shaft $A_2$ during overdrive ratio operation.

FIG. 11 EMBODIMENT

Figures 11, 11A:
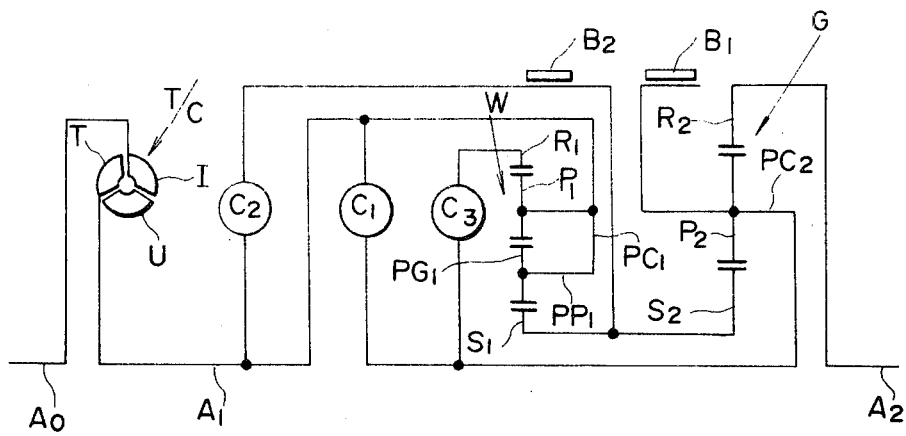
FIG. 11 is a schematic illustration of a fourth embodiment of the invention falling within Group 4.
FIG. 11A is a table showing the engagement of the clutches and brakes associated with the embodiment of FIG. 11 to provide the various speed ratios.

Referring to FIG. 11, a fourth embodiment of the Group 4 is explained.

This embodiment is different from the embodiment of FIG. 10 in that an input planetary gear set W in the form of a dual-pinion planetary gear set has a pinion carrier $PC_1$ connected permanently to a turbine shaft $A_1$ and a sun gear $S_1$ connected permanently to a sun gear $S_2$ of an output planetary gear set G so that the carrier $PC_1$ is regarded as a first element and the sun gear $S_1$ as a second element.

The sequence for engagement and release of clutches $C_1$, $C_2$, $C_3$ abd brakes $B_1$, $B_2$ in the transmission of FIG. 11 is illustrated in the Table of FIG. 11A. In this example, $\alpha_1 = 0.55$ and $\alpha_2 = 0.45$.

When the first speed ratio or low is desired, the bridging clutch $C_3$ is engaged and low and reverse brake $B_1$ is applied. Since the carrier $PC_2$ and ring gear $R_1$ are held and since the sun gear $S_2$ rotates in unison with the sun gear $S_1$, a torque delivery path is established through the planetary gear train.

In making a shift from the first speed ratio to the second speed ratio or intermediate, the brake $B_1$ is released and the intermediate and overdrive brake $B_2$ is applied with the clutch $C_3$ kept engaged. Since the sun gear $S_1$ and sun gear $S_2$ are held and since the pinion carrier $PC_2$ rotates in unison with the ring gear $R_1$, a torque delivery path is established through the planetary gear train.

In making a shift to the third or direct drive, the clucth $C_3$ is engaged and brake $B_2$ is released with the clutch $C_3$ kept engaged. Since the turbine power is also fed to the ring gear $R_1$ through the clutches $C_1$ and $C_3$, both planetary gear sets W and G are locked and rotate in unison.

The bridging clutch $C_3$ which has been kept engaged during first, second and third speed ratio operations, is disengaged during the fourth speed ratio or overdrive ratio operation. The overdrive is obtained when the direct and overdrive clutch $C_1$ is engaged and intermediate and overdrive brake $B_2$ is applied with all the other friction elements $C_2$, $C_3$, $B_1$ kept released. Since the sun gear $S_2$ is held and the turbine power is fed to the carrier $PC_2$, a torque delivery path is established through the output planetary gear set G. The ring gear $R_1$ free wheels.

The reverse speed ratio is obtained when the reverse clutch $C_2$ is engaged and low and reverse brake $B_1$ is applied with all other friction elements $C_1$, $C_3$, $B_2$ kept released. The ring gear $R_1$ free wheels.

In the transmission system of FIG. 11, the rotary element which rotates at the maximum speed is the ring gear $R_2$ during overdrive ratio operation. In this example, the ring gear $R_2$ rotates at a speed 1.45 times that of the turbine shaft $A_1$ during overdrive ratio operation.

Since the ring gear $R_2$ rotates in unison with the driven shaft $A_2$, it will be appreciated that there is no rotary element which overspeeds the driven shaft $A_1$ during overdrive ratio operation.

FIG. 12 EMBODIMENT

Figures 12, 12A:
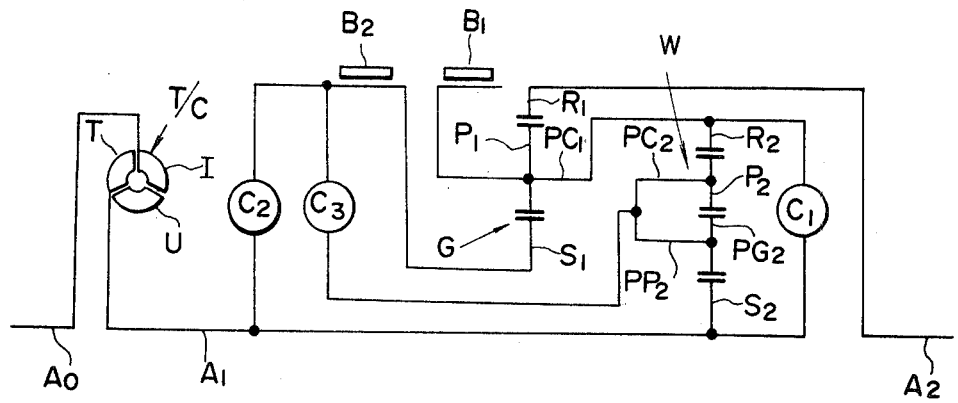
FIG. 12 is a schematic illustration of a fifth embodiment of the invention falling within Group 4.
FIG. 12A is a table showing the engagement of the clutches and brakes associated with the embodiment of FIG. 12 to provide the various speed ratios.

Referring to FIG. 12 a fifth embodiment of Group 4 is explained.

In FIG. 12, this embodiment is different from the embodiment of FIG. 11 in that an input planetary gear train W in the form of a dual-pinion planetary gear set has a sun gear $S_2$ connected to a drive shaft $A_0$ through a torque converter T/C, a ring gear $R_2$ permanently connected to an input element $PC_1$ of an output planetary gear set G, and a pinion carrier $PC_2$ connected to a reaction element $S_1$ of the output element G through a bridging clutch $C_3$.

The sequence for the engagement and release of the cluthes $C_1$, $C_2$, $C_3$ and brakes $B_1$, $B_2$ in the transmission of FIG. 12 is illustrated in the Table of FIG. 12A. In this example, $\alpha_1 = \alpha_2 = 0.45$.

When the first speed ratio or low is desired, the bridging clutch $C_3$ is engaged and low and reverse brake $B_1$ is applied. Since the carrier $PC_1$ and ring gear $R_2$ are held and since the sun gear $S_1$ rotates in unison with carrier $PC_2$, a torque delivery path is established so that the power fed to the sun gear $S_2$ causes the ring gear $R_1$ and the driven shaft $A_2$ to rotate forwardly.

In making a shift from the first speed ratio to the second speed ratio or intermediate, the brake $B_1$ is released and intermediate and overdrive brake $B_2$ is applied with the clutch $C_3$ kept engaged. Since the sun gear $S_1$ and carrier $PC_2$ are held, a torque delivery path where two planetary gear sets are active is established.

In making a shift to the third speed ratio or direct drive, the brake $B_2$ is released and direct and overdrive clutch $C_1$ is engaged with the clutch $C_3$ kept engaged. Since the turbine power is fed also to ring gear $R_2$ and carrier $PC_1$, both of the planetary gear sets W and G are locked and rotate in unison.

The bridging clutch $C_3$ which has been kept engaged during first, second and third speed ratio operations, is disengaged during the fourth speed ratio or overdrive operation. The overdrive is obtained when the direct and overdrive clutch $C_1$ is engaged and intermediate and overdrive brake $B_2$ is applied with all the other friction elements $C_2$, $C_3$, $B_1$ kept released. Since the sun gear $S_1$ is held, a torque delivery path is established through the output planetary gear set G. The carrier $PC_2$ free wheels.

The reverse speed ratio is obtained when the reverse clutch $C_2$ is engaged and low and reverse brake $B_1$ is applied with all other friction elements $C_1$, $C_3$, $B_2$ kept released. Since the carrier $PC_1$ is held and power is fed to the sun gear $S_1$, a torque delivery path is established through the output planetary gear set G. The carrier $PC_2$ free wheels.

In the transmission system of FIG. 12, the rotary element which rotates at the maximum speed is the ring gear $R_1$ during overdrive ratio operation. In this example, the ring gear $R_1$ rotates at a speed 1.45 times that of the turbine shaft $A_1$. Since the ring gear $R_1$ rotates in unison with the driven shaft $A_2$, it will be appreciated that no rotary element overspeeds the driven shaft $A_2$ during overdrive ratio operation.

FIG. 13 EMBODIMENT

Figures 13, 13A:
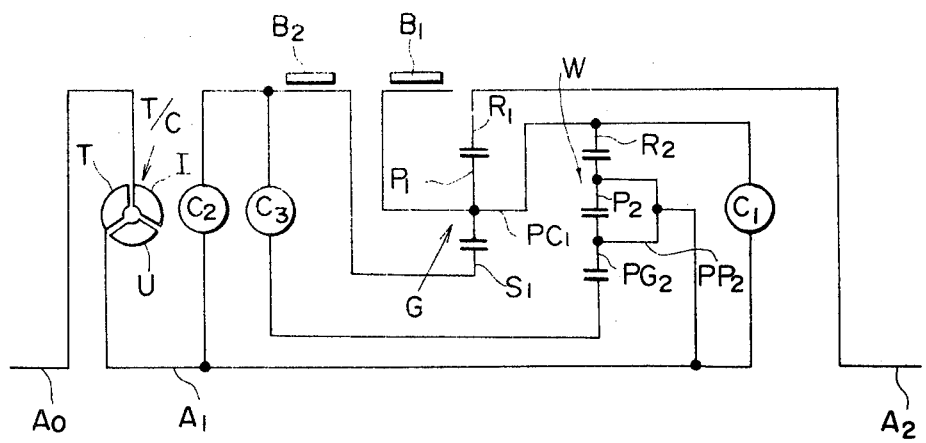
FIG. 13 is a schematic illustration of a sixth embodiment of the invention falling within Group 4.
FIG. 13A is a table showing the engagement of the clutches and brakes associated with the embodiment of FIG. 13 to provide the various speed ratios.

Referring to FIG. 13, a sixth embodiment of the Group 4 is explained.

This embodiment is different from the embodiment of FIG. 12 in that an input planetary gear set W in the form of a dual-pinion planetary gear set has a pinion carrier $PC_2$ connected to a drive shaft $A_0$ through a torque converter T/C, a ring gear $R_2$ permanently connected to an input element $PC_1$ of an output planetary gear set G, and a sun gear $S_3$ connected to a sun gear $S_1$ through a bridging clutch $C_3$, so that the pinion carrier $PC_2$ can be regarded as a first element, the ring gear $R_2$ as a second element, and the sun gear $S_2$ as a third element.

The sequence for the engagement and release of clutches $C_1$, $C_2$, $C_3$ and brakes $B_1$, $B_2$ in the transmission of FIG. 13 is illustrated in the Table of FIG. 13A. In this example, $\alpha_1 = 0.45$ and $\alpha_2 = 0.55$.

When the first speed ratio or low is desired, the bridging clutch $C_3$ is engaged and low and reverse brake $B_1$ is applied. Since pinion carrier $PC_1$ and ring gear $R_2$ are held and since sun gear $S_1$ rotates in unison with sun gear $S_2$, a torque delivery path where both planetary gear sets G and W are active is established.

In making a shift from the first speed ratio to the second speed ratio or intermediate, the brake $B_1$ is released and brake $B_2$ is applied with clutch $C_3$ kept engaged. Since sun gear $S_1$ and sun gear $S_2$ are held and since ring gear $R_2$ rotates in unison with pinion carrier $PC_1$, a torque delivery path where both of planetary gear sets G and W are active is established.

In making a shift to the third speed ratio or direct drive, the brake $B_2$ is released and clutch $C_1$ is engaged with clutch $C_3$ kept engaged. Since the power is fed also to ring gear $R_2$, both planetary gear sets are locked and rotate in unison.

The bridging clutch $C_3$ which has been kept engaged during first, second and third speed ratio operations, is disengaged during the fourth speed ratio or overdrive operation. The overdrive is obtained when the direct and overdrive clutch $C_1$ is engaged and intermediate and overdrive brake $B_2$ is applied with all the other friction elements $C_2$, $C_3$, $B_1$ kept released. Since the sun gear $S_1$ is held and since $PC_1$ rotates in unison with the carrier, the sun gear $S_1$ is held and the power is fed to the pinion carrier $PC_1$, a torque delivery path is established through the output planetary gear set G.

The reverse speed ratio is established when the reverse clutch $C_2$ is engaged and the low and reverse brake $B_1$ is applied. Since the pinion carrier $PC_2$ is held and the power is fed to sun gear $S_1$, a torque delivery path performing the reverse drive is established.

In the transmission of FIG. 13, the rotary element which rotates at the maximum speed is the ring gear $R_1$ during overdrive ratio operation. In this example, the ring gear $R_1$ rotates at a speed 1.45 times that of the turbine shaft $A_1$. Since the ring gear $R_1$ rotates in unison with the driven shaft $A_2$, it will be appreciated that there is no rotary element which overspeeds the driven shaft $A_2$ during overspeed ratio operation.

FIG. 14 EMBODIMENT

Figures 14, 14A:
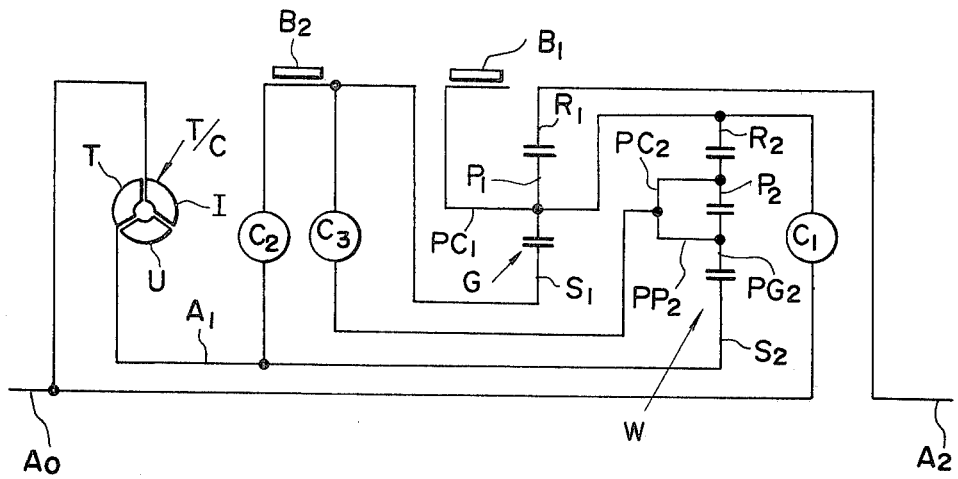
FIG. 14 is a schematic illustration of a seventh embodiment of the invention falling with Group 4.
FIG. 14A is a table showing the engagement of the clutches and brakes associated with the embodiment of FIG. 14.

Refering to FIG. 14, a seventh embodiment of Group 4 is explained.

This embodiment is substantially similar to the embodiment illustrated in FIG. 12 except that a direct and overdrive clutch $C_1$ connects when engaged a ring gear $R_2$ of an output planetary gear set W with a drive shaft $A_0$, bypassing a hydraulic torque converter T/C.

The sequence for the engagement and release of clutches $C_1$, $C_2$, $C_3$ and brakes $B_1$, $B_2$ in the transmission of FIG. 14 is illutrated in the Table of FIG. 14A. In this example, $\alpha_1 = \alpha_2 = 0.45$.

The operation of this embodiment is however different from the embodiment in FIG. 12 during third speed ratio and fourth speed ratio operations.

The third speed ratio is obtained when clutch $C_1$ and clutch $C_3$ are engaged with all the other friction elements kept released. Since the power on the drive shaft $A_0$ is fed to carrier $PC_1$ and ring gear $R_2$ and the power on the turbine shaft $A_1$ is fed to sun gear $S_2$ and since the sun gear $S_1$ rotates in unison with carrier $PC_2$, a torque delivery path is established where two planetary gear sets G and W are active and where the mechanical torque transmission ratio is 63%.

The fourth speed ratio or overdrive ratio operation is obtained when a direct and overdrive clutch $C_1$ is engaged and intermediate and overdrive brake $B_2$ is applied with all the other friction elements $C_2$, $B_1$ kept released. Since the sun gear $S_1$ is held and the power on the drive shaft $A_0$ is fed to the carrier $PC_1$, a torque delivery path providing overdrive is established through the planetary gear set G. The mechanical torque transmission ratio in this overdrive is 100%.

In the transmission system of FIG. 14, the rotary element which rotates at the maximum speed is the ring gear $R_1$ during overdrive ratio operation. In this example, the ring gear $R_1$ rotates at a speed 1.45 times that of the turbine shaft $A_1$ during overdrive ratio operation. Since the ring gear $R_1$ rotates in unison with the driven shaft $A_2$, it will be appreciated that no rotary element overspeeds the driven shaft $A_2$ during the overdrive ratio operation.

FIG. 15 EMBODIMENT

Figures 15, 15A:
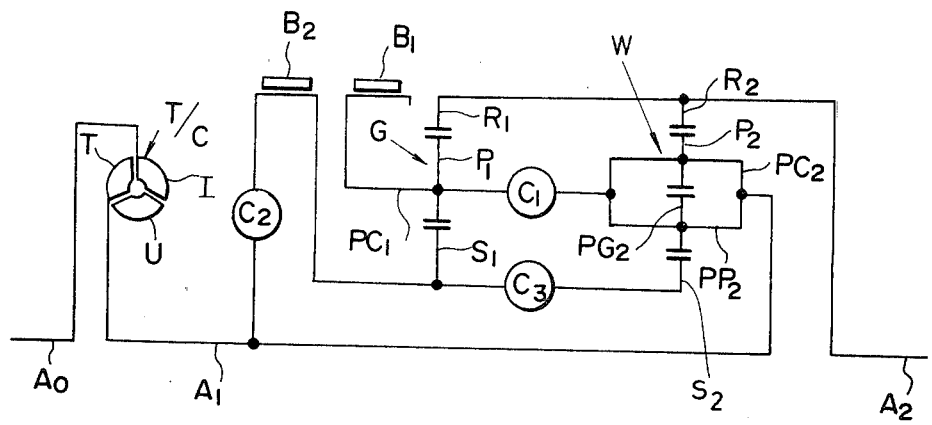
FIG. 15 is a schematic illustration of an eighth embodiment of the invention falling within Group 4.
FIG. 15A is a table showing the engagement of the clutches and brakes associated with the embodiment of FIG. 15A to provide the various speed ratios.

Referring to FIG. 15, an eighth embodiment of the Group 4 is explained.

This embodiemnt is different from the embodiment of FIG. 13 in that an input planetary gear set in the form of a dual-pinion planetary gear set W has a ring gear $R_2$ connected to an output element $R_1$ of the output planetary gear set G and a pinion carrier $PC_2$ connected to an input element $PC_1$ of the output planetary gear set G through a direct and overdrive clutch $C_1$.

The sequence for the engagement and release of the clutches $C_1$, $C_2$, $C_3$ and brakes $B_1$, $B_2$ in the tranmission of FIG. 15 is illustrated in the Table of FIG. 15A. In this example, $\alpha_1 = 0.4$ and $\alpha_2 = 0.55$.

When the first speed ratio or low is desired, the bridging clutch $C_3$ is engaged and low and reverse brake $B_1$ is applied. Since the power on the turbine shaft $A_1$ is fed to the carrier $PC_2$ and the carrier $PC_1$ is held and since the sun gear $S_1$ rotates in unison with the sun gear $S_2$, a torque delivery path wherein two planetary gear sets G and W are active is established.

In making a shift from the first speed ratio to the second speed ratio or intermediate, the brake $B_1$ is released and intermediate and overdrive brake $B_2$ is applied with the clutch $C_3$ kept engaged. Since the turbine power is fed to the carrier $PC_2$ and the sun gear $S_2$ is held, a torque delivery path is established through the input planetary gear set W. The pinion carrier $PC_1$ free wheels.

The third and direct drive is established when the clutch $C_1$ and clutch $C_3$ are engaged with all the other friction elements kept released. The planetary gear sets are locked and rotate in unison.

The bridging clutch $C_3$ which has been kept engaged during the first, second and third speed ratios, is now disengaged during the fourth speed ratio operation. The overdrive is obtained when the direct and overdrive clutch $C_1$ is engaged and intermediate and overdrive brake $B_2$ is applied with all the other friction elements $C_2$, $C_3$, $B_1$ kept released. Since the power is fed to the carrier $PC_1$ through the clutch $C_1$ and since the sun gear $S_1$ is held, a torque delivery path providing an overdrive is established through the output planetary gear set G.

The reverse speed ratio is obtained when the reverse clutch $C_2$ is engaged and low and reverse brake $B_1$ is applied with all the other friction elements kept released. Since the carrier $PC_1$ is held and the power is fed to the sun gear $S_1$, a torque delivery path providing the reverse drive is established through the output planetary gear set G. The sun gear $S_2$ free wheels.

In the transmission system of FIG. 15, the rotary element which rotates at the maximum speed is the sun gear $S_2$ during overdrive ratio operation. In this example, the sun gear $S_2$ rotates at a speed 1.75 times that of turbine shaft $A_1$.

As having been described, according to the present invention, among the rotary elements of two planetary gear sets, only one pair of rotary elements is permanently connected, while, another pair of rotary elements are inner connected through a bridging clutch, and this clutch is released during the fourth speed ratio providing an overdrive, thus making it possible to provide an overdrive without any increase in component parts and without increase in weight, space and cost. Moreover, according to the present invention, there is no rotatry element which rotates at excessively high speed, thus providing an advantage in terms of low vibration and increased durability. Furthermore, according to FIGS. 6 and 14 embodiments, a split power drive between torque converter input (fluid drive) and a direct input (mechanical drive) is employed so that energy loss due to rotary vibration and slippage in the torque converter is reduced.

What is claimed is:

1. A transmission for an automotive vehicle, comprising:
   a drive shaft;

a driven shaft;

a planetary gear train between said drive and driven shafts which includes only two planetary gear sets and which comprises:

an output planetary gear set having an output element connected to said driven shaft, an input element and a reaction element, a brake effective upon engagement to hold said reaction element, an input planetary gear set having a first element connected to said drive shaft, a second element, and a third element, a bridging clutch effective upon engagement to connect said third element of said input planetary gear set with said output planetary gear set, first means for establishing a first power path connecting said input element of said output planetary gear set to said drive shaft to provide a direct drive between said drive and driven shafts upon engagement of said bridging clutch and upon disengagement of said brake, said second element of said input planetary gear set being permanently connected to said output planetary gear set, and second means for establishing a second power path connecting said input element of said output planetary gear set to said drive shaft to provide an overdrive between said drive and driven shafts upon disengagement of said bridging clutch and upon engagement of said brake.

2. A transmission as claimed in claim 1, wherein said first means for establishing said first power path comprises:

a hydraulic torque converter, and a direct and overdrive clutch effective upon engagement to connect said input element of said output planetary gear set to said drive shaft through said torque converter, wherein said first element of said input planetary gear set is connected to said drive shaft through said hydraulic torque converter, and wherein said brake is effective upon engagement to hold said reaction element of said output planetary gear set for establishing an intermediate reduction gear ratio between said drive and driven shafts upon engagement of said bridging clutch and of said brake and upon disengagement of said direct and intermediate clutch.

3. A transmission as claimed in claim 1, wherein said first means for establishing said first power path includes a hydraulic torque converter, and a direct and overdrive clutch effective upon engagement to connect said input element of said output planetary gear set with said drive shaft bypassing said hydraulic torque converter, wherein said first element of said input planetary gear set is connected to said drive shaft through said hydraulic torque converter, and wherein said brake is effective upon engagement to hold said reaction element of said output planetary gear set for establishing an intermediate reduction gear ratio between said drive and drive shafts upon engagement of said bridging clutch and of said brake and upon disengagement of said direct and overdrive clutch.

4. A transmission as claimed in claim 2 or claim 3, wherein said planetary gear train includes a low and reverse brake effective upon engagement to hold said input element of said output planetary gear set for establishing a low reduction gear ratio upon engagement of said bridging clutch and upon disengagement of said first-mentioned brake and of said direct and overdrive clutch.

5. A transmission as claimed in claim 4, wherein said planetary gear train includes a reverse clutch effective upon engagement to connect said reaction element of said output planetary gear set with said turbine shaft through said hydraulic torque converter for establishing a reverse drive between said drive and driven shafts upon engagement of said low and reverse brake and upon disengagement of said bridging clutch, of said direct and overdrive clutch and of said first-mentioned brake.

6. A transmission as claimed in claim 5, wherein said output planetary gear set is a simple planetary gear set, wherein said third element of said input planetary gear set is connected through said bridging clutch to said output element of said output planetary gear set, and said second element of said input planetary gear set is connected to said input element of said output planetary gear set, whereby said input planetary gear set is locked during operation of the transmission during overdrive operation.

7. A transmission as claimed in claim 5, wherein said output planetary gear set is a dual-pinion planetary gear set, wherein said third element of said input planetary gear set is connected through said bridging clutch to said output element of said output planetary gear set, and said second element of said input planetary gear set is connected to said reaction element.

8. A transmission as claimed in claim 5, wherein said third element of said input planetary gear set is connected through said bridging clutch with said input element of said output planetary gear set, and said second element of said input planetary gear set is connected to one of said reaction element and said output element of said output planetary gear set.

9. A transmission as claimed in claim 6, wherein said input planetary gear set is a simple planetary gear set, wherein;

said input element of said output planetary gear set is a pinion carrier, said reaction element of said output planetary gear set is a ring gear, and said reaction element of said output planetary gear set is a sun gear, said first element of said input planetary gear set is a sun gear, said second element of said input planetary gear set is a ring gear, and said third element of said input planetary gear set is a pinion carrier.

10. A transmission as claimed in claim 8, wherein said output planetary gear set is a simple planetary gear set, and said input planetary gear set is a simple planetary gear set, wherein said input element of said output planetary gear set is a pinion carrier, said reaction element of said output planetary gear set is a sun gear, and
said output element of said output planetary gear set is a ring gear, and
wherein
said first element of said input planetary gear set is a sun gear,
said second element of said input planetary gear set is a pinion carrier, and
said third element of said output planetary gear set is a ring gear,
and wherein said second element of said input planetary gear set is connected to said output element of said output planetary gear set.

11. A transmission as claimed in claim 6, wherein said input planetary gear set is a dual-pinion planetary gear set,
wherein
said input element of said output planetary gear set is a pinion carrier,
said output element of said output planetary gear set is a ring gear, and
said reaction element of said output planetary gear set is a sun gear,
and wherein
said first element is a pinion carrier,
said second element is a sun gear, and
said third element is a ring gear.

12. A transmission as claimed in claim 6, wherein said input planetary gear set is a dual-pinion planetary gear set,
wherein
said input element of said output planetary gear set is a pinion carrier,
said output element of said output planetary gear set is a ring gear, and
said reaction element of said output planetary gear set is a pinion carrier,
wherein
said first element of said input planetary gear set is a sun gear,
said second element of said input planetary gear set is a pinion carrier, and
said third element of said input planetary gear set is a ring gear.

13. A transmission as claimed in claim 6, wherein said input planetary gear set is a dual-pinion planetary gear set,
wherein
said input element of said output planetary gear set is a pinion carrier,
said output element of said output planetary gear set is a ring gear, and
said reaction element of said output planetary gear set is a sun gear,
wherein
said first element of said input planetary gear set is a sun gear,
said second element of said input planetary gear set is a pinion carrier, and
said third element of said input planetary gear set is a ring gear.

14. A transmission as claimed in claim 6, wherein said input planetary gear set is a dual-pinion planetary gear set,
wherein
said input element of said output planetary gear set is a pinion carrier,
said output element of said output planetary gear set is a ring gear, and
said reaction element of said output planetary gear set is a sun gear,
wherein
said first element of said input planetary gear set is a sun gear,
said second element of said input planetary gear set is a pinion carrier, and
said third element of said input planetary gear set is a ring gear.

15. A transmission as claimed in claim 7, wherein said input planetary gear set is a simple planetary gear set,
wherein
said input element of said output planetary gear set is a ring gear,
said output element of said output planetary gear set is a sun gear, and
said reaction element of said output planetary gear set is a pinion carrier,
and wherein
said first element of said input plnetary gear set is a ring gear,
said second element of said input planetary gear set is a sun gear, and
said third element of said input planetary gear set is a pinion carrier.

16. A transmission as claimed in claim 8, wherein said second element of said input planetary gear set is connected to said output element of said output planetary gear set,
wherein
said output planetary gear set is a simple planetary gear set and said input planetary gear set is a dual-pinion planetary gear set,
wherein
said input element of said output planetary gear set is a pinion carrier,
said output element of said output planetary gear set is a ring gear, and
said reaction element of said output planetary gear set is a sun gear,
wherein
said first element of said input planetary gear set is a pinion carrier,
said second element of said input planetary gear set is a ring gear, and
said third element of said input planetary gear set is a sun gear.

17. A transmission as claimed in claim 8, wherein said second element of said input planetary gear set is connected to said output element of said output planetary gear set,
wherein said output planetary gear set is a simple planetary gear set and said input planetary gear set is a dual-pinion planetary gear set,
wherein
said input element of said output planetary gear set is a pinion carrier,
said output element of said output planetary gear set is a ring gear, and
said reaction element of said output planetary gear set is a sun gear,
wherein
said first element of said input planetary gear set is a sun gear,
said second element of said input planetary gear set is a ring gear, and said third element of said input planetary gear set is a pinion carrier.

18. A transmission as claimed in claim 8, wherein said second element of said input planetary gear set is connected to said reaction element of said output planetary gear set,
wherein said output planetary gear set is a simple planetary gear set and said input planetary gear set is a dual-pinion planetary gear set,
wherein
said input element is a pinion carrier,
said output element is a ring gear, and
said reaction element is a sun gear, and
wherein
said first element of said input planetary gear set is a sun gear,
said second element of said input planetary gear set is a pinion carrier, and
said third element of said input planetary gear set is a ring gear.

19. A transmission as claimed in claim 8, wherein said second element of said input plantary gear set is connected to said reaction element of said output planetary gear set,
wherein said output planetary gear set is a simple planetary gear set and said input planetary gear set is a dual-pinion planetary gear set,
wherein
said input element of said output planetary gear set is a pinion carrier,
said output element of said output planetary gear set is a ring gear, and
said reaction element of said output planetary gear set is a sun gear,
and wherein
said first element of said input planetary gear set is a pinion carrier,
said second element of said input planetary gear set is a sun gear, and
said third element of said input planetary gear set is a ring gear.

20. A transmission as claimed in claim 5, wherein said third element of said input planetary gear set is connected through said bridging clutch with said reaction element of said output planetary gear set, and
said second element of said input planetary gear set is connected to said input element of said output planetary gear set.

21. A transmission as claimed in claim 20, wherein said output planetary gear set is a simple planetary gear set and said input planetary gear set is a dual-pinion planetary gear set,
wherein
said input element of said output planetary gear set is a pinion carrier,
said output element of said output planetary gear set is a ring gear, and
said reaction element of said output planetary gear set is a sun gear,
and wherein
said first element of said input planetary gear set is a sun gear,
said second element of said input planetary gear set is a ring gear, and
said third element of said input planetary gear set is a pinion carrier.

22. A transmission as claimed in claim 20, wherein said output planetary gear set is a simple planetary gear set and said input planetary gear set is a dual-pinion planetary gear set,
wherein
said input element of said output planetary gear set is a pinion carrier,
said output element of said output planetary gear set is a ring gear, and
said reaction element of said output planetary gear set is a sun gear,
and wherein
said first element of said input planetary gear set is a pinion carrier,
said second element of said input planetary gear set is a ring gear, and
said third element of said input planetary gear set is a sun gear.

23. A transmission as claimed in claim 20, wherein said output planetary gear set is a simple planetary gear set and said output planetary gear set is a dual-pinion planetary gear set,
and wherein
said input element of said output planetary gear set is a pinion carrier,
said output planetary gear set of said output planetary gear set is a ring gear, and
said reaction element of said output planetary gear set is a sun gear, and
wherein
said first element of said input planetary gear set is a sun gear,
said second element of said input planetary gear set is a ring gear, and
said third element of said input planetary gear set is a pinion carrier.

24. A transmission as claimed in claim 5, wherein said third element of said input planetary gear set is connected through said first-mentioned clutch with said reaction element of said output planetary gear set, and
said second element of said input planetary gear set is connected to said output element of said output planetary gear set.

25. A transmission as claimed in claim 24, wherein said output planetary gear set is a simple planetary gear set and said input planetary gear set is a dual-pinion planetary gear set,
and wherein
said input element of said output planetary gear set is a pinion carrier,
said output element of said output planetary gear set is a ring gear, and
said reaction element of said output planetary gear set is a sun gear,
and wherein
said first element of said input planetary gear set is a pinion carrier,
said second element of said input planetary gear set is a ring gear, and
said third element of said input planetary gear set is a sun gear.

* * * * *